(12) United States Patent
Ichikawa et al.

(10) Patent No.: US 6,858,381 B2
(45) Date of Patent: Feb. 22, 2005

(54) METHOD AND APPARATUS FOR FORMING SILVER HALIDE EMULSION PARTICLES AND METHOD FOR FORMING FINE PARTICLES

(75) Inventors: Yasunori Ichikawa, Minami-Ashigara (JP); Katsuhisa Ohzeki, Minami-Ashigara (JP); Fumiko Shiraishi, Minami-Ashigara (JP); Tetsurou Mitsui, Minami-Ashigara (JP); Shigeharu Urabe, Minami-Ashigara (JP); Nobuo Nishida, Uozu (JP); Kenichi Harashima, Uozu (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 63 days.

(21) Appl. No.: 10/420,926

(22) Filed: Apr. 23, 2003

(65) Prior Publication Data

US 2003/0224308 A1 Dec. 4, 2003

(30) Foreign Application Priority Data

Apr. 26, 2002 (JP) ........................................ 2002-126169

(51) Int. Cl.[7] ........................... G03C 1/015; B01J 10/00; B01J 8/04
(52) U.S. Cl. ....................... 430/569; 137/890; 137/896; 422/194; 423/DIG. 9; 423/DIG. 11
(58) Field of Search ......................... 422/194; 430/569; 137/890, 896; 423/DIG. 9, DIG. 11

(56) References Cited

U.S. PATENT DOCUMENTS

| | | | |
|---|---|---|---|
| 5,104,786 A | 4/1992 | Chronis et al. | |
| 5,380,641 A | 1/1995 | Urabe et al. | |
| 5,484,697 A | * 1/1996 | Mignot et al. | ............... 430/569 |
| 5,985,535 A | 11/1999 | Urabe | |
| 6,048,906 A | * 4/2000 | Ernst et al. | .................... 516/77 |
| 6,096,495 A | * 8/2000 | Kasai et al. | ................. 430/569 |
| 6,605,422 B2 | * 8/2003 | Urabe | ......................... 430/569 |
| 2001/0028999 A1 | 10/2001 | Saito | |

FOREIGN PATENT DOCUMENTS

| | | |
|---|---|---|
| EP | 0734761 A2 | 10/1996 |
| JP | 4-292416 | 10/1992 |
| JP | 11-217217 | 10/1999 |
| JP | 2000-187293 | 4/2000 |

* cited by examiner

Primary Examiner—Richard L. Schilling
(74) Attorney, Agent, or Firm—Sughrue Mion, PLLC

(57) ABSTRACT

The mixing state of static mixing is optimized, so that it is possible to form silver halide emulsion particles in small sizes with an excellent mono-dispersion characteristic. An aqueous solution of haloid salt is blown out from a first nozzle into a mixing chamber as a rectilinear flow of turbulent flow, and before eddy viscosity formed when the rectilinear flow is blown out from the first nozzle of a small diameter to the mixing chamber of a greater diameter reaches a maximum, or before a maximum flow speed of the rectilinear flow is reduced to 1/10 or below, an aqueous solution of silver nitrate is blown out from a second nozzle as a crossflow of turbulent flow which crosses the rectilinear flow at a substantially right angle and is entrained by the rectilinear flow, so that the two solutions are allowed to mix and react with each other instantaneously, and a liquid resulting from the mixing and reaction is discharged from a discharge duct.

7 Claims, 33 Drawing Sheets

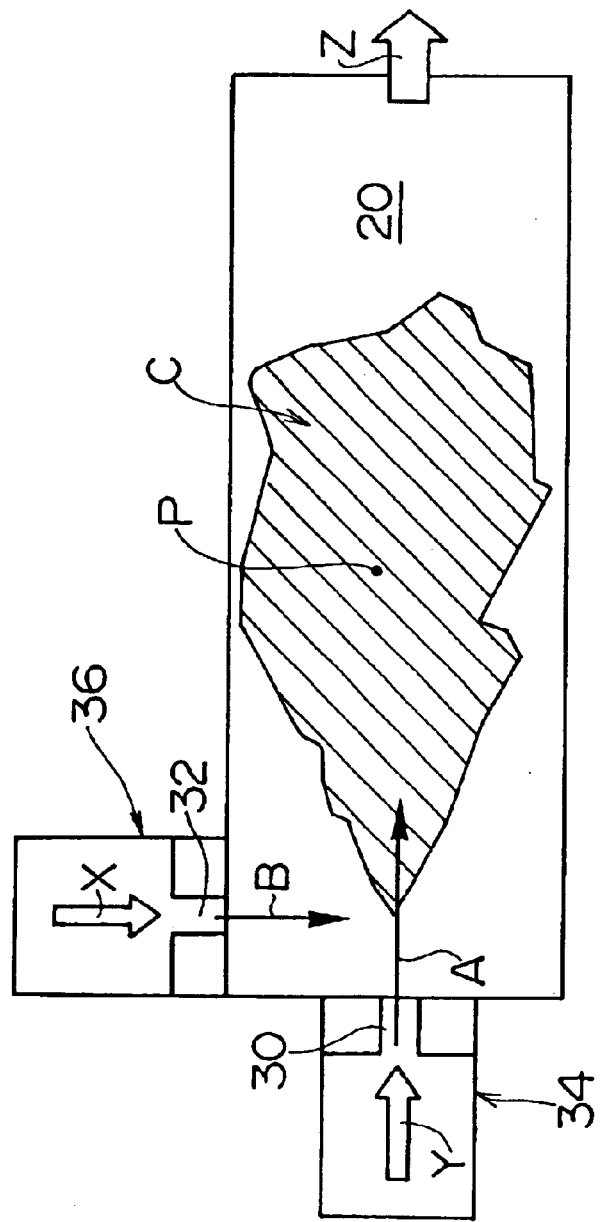

METHOD AND APPARATUS FOR FORMING SILVER HALIDE EMULSION PARTICLES AND METHOD FOR FORMING FINE PARTICLES

BACKGROUND OF THE INVENTION

1. Field of the Invention

The present invention relates to a method and apparatus for forming silver halide emulsion particles and method for forming fine particles, and more particularly, to a technology of forming silver halide emulsion particles using a static mixing apparatus.

2. Description of the Related Art

Forming silver halide emulsion particles used for silver halide photosensitive material involves two major steps. One is a nucleus formation step of forming seed particles of silver halide emulsion particles and the other is a particle growth step of allowing seed particles to grow to particles in sizes suitable for photosensitive material.

First, in the nucleus formation step, preparing uniformly flat-shaped particles requires an increase of the probability of occurrence of double twin crystals with a uniform size distribution of particles in a stage of seed particles which become the seeds of flat-shaped particles. In order to allow such flat-shaped particles to grow, it is effective to add seed particles for growth formed in the nucleus formation step to a system in which growth host particles exist to thereby regulate the growth direction and develop Ostwald maturation. Such seed particles are required to have microsizes and an excellent mono-dispersion characteristic.

In forming such seed particles, if an aqueous solution of silver salt (hereafter will be explained in an example of "aqueous solution of silver nitrate") and aqueous solution of haloid salt are mixed in quite a low concentration state and allowed to react with each other by a mixing reactor, it is possible to form seed particles of desired twin crystals except excessively weak stirring or mixing conditions, but use under low concentration conditions is not industrially profitable. Thus, forming seed particles at an industrially profitable concentration level or letting seed particles grow requires reaction under high concentration conditions.

Stably forming minute silver halide emulsion particles in the nucleus formation step or particle growth step requires considerations of the apparatus to prevent nucleus formation and growth of particles from simultaneously occurring and it is desirable to use a small volume static mixing apparatus that will not cause backflow as the mixing apparatus for that purpose. Here, the static mixing apparatus refers to a mixing apparatus that has no stirring device such as a stirrer at the mixing site.

Methods for forming silver halide emulsion particles using such a static mixing apparatus are disclosed in Japanese Patent Application Publication Nos. 4-292416, 11-217217, 2000-187293, etc., and these methods allow an aqueous solution of silver nitrate and aqueous solution of haloid salt to mix and react with each other instantaneously by allowing two jet flows of the aqueous solutions of a high Re (Reynolds number) to collide with each other at an intersection of very narrow pipes such as T-shaped pipes or Y-shaped pipes and discharge the liquid resulting from mixing reaction in a short time.

In the case of a conventional static mixing apparatus, the jet flow speed should be increased to increase the mixing efficiency by allowing both liquids, which are high-speed turbulent flows, to collide with each other. However, when the jet flow speed is increased, frictional heat is generated by friction between both liquids. Since reaction for forming silver halide emulsion particles is heating reaction, if frictional heat is added to the heating reaction, growth through Ostwald maturation advances in the seed particles formed by reaction between an aqueous solution of silver nitrate and aqueous solution of haloid salt, causing the defect that it is difficult to form silver halide emulsion particles which are fine particles with a good mono-dispersion characteristic.

Furthermore, a high-speed turbulent jet flow is liable to cavitation, and bubbles by the cavitation gather together easily forming a gas-liquid interface in the static mixing apparatus, which produces unevenness in mixing and reaction, resulting in the defect that it is difficult to form silver halide emulsion particles which are fine particles with an excellent mono-dispersion characteristic.

SUMMARY OF THE INVENTION

Against such a background, there has been a demand for a static mixing apparatus capable of obtaining favorable mixing performance even if an aqueous solution of haloid salt or aqueous solution of silver nitrate is blown out at a low speed and at the same time forming silver halide emulsion particles which are fine particles with an excellent mono-dispersion characteristic even if the aqueous solution of haloid salt and aqueous solution of silver nitrate are highly concentrated.

The present invention has been implemented in view of such circumstances and it is an object of the present invention to provide a method and apparatus for forming silver halide emulsion particles capable of reducing frictional heat during mixing of an aqueous solution of silver nitrate and aqueous solution of haloid salt, preventing cavitation, efficiently performing mixing and reaction, optimizing the mixing state in static mixing and thereby forming silver halide emulsion particles in small particle sizes and with an excellent mono-dispersion characteristic, and to further provide a method of forming not only silver halide emulsion particles but also fine particles with an excellent mono-dispersion characteristic.

In order to attain the above-described object, the present invention provides a method for forming fine particles by blowing out a plurality of types of solutions from their respective nozzles into a mixing chamber of a larger diameter than the diameters of the nozzles to allow the solutions to mix and react with each other and discharging the liquid resulting from the mixing and reaction from an outlet of a smaller diameter than the diameter of the mixing chamber, characterized in that one of the plurality of types of solutions is blown out into the mixing chamber as a rectilinear flow of turbulent flow, and at a position before eddy viscosity, which is formed when the rectilinear flow is blown out from the nozzle of a small diameter into the mixing chamber of a large diameter, reaches a maximum, the other liquid is blown out as a crossflow that crosses the rectilinear flow at a substantially right angle and the one liquid and the other liquid are thereby allowed to mix and react with each other instantaneously.

In order to attain the above-described object, the present invention provides a method for forming fine particles by blowing out a plurality of types of solutions from their respective nozzles into a mixing chamber of a larger diameter than the diameters of the nozzles to allow the solutions to mix and react with each other and discharging the liquid resulting from the mixing and reaction from an outlet of a smaller diameter than the diameter of the mixing chamber, characterized in that one of the plurality of types of solutions is blown out into the mixing chamber as a rectilinear flow of turbulent flow and at a position before the rectilinear flow is reduced to $\frac{1}{10}$ or less of a maximum flow speed, the other liquid is blown out as a crossflow that crosses the rectilinear flow at a substantially right angle and the one liquid and the other liquid are thereby allowed to mix and react with each other instantaneously.

The present invention blows out one of a plurality of types of solutions into a mixing chamber as a rectilinear flow of turbulent flow, blows out the other liquids as rectilinear flows as crossbows that cross the above-described rectilinear flow at a substantially right angle at a position before eddy viscosity, which is formed when the rectilinear flow is blown out from the nozzle of a small diameter into the mixing chamber of a large diameter, reaches a maximum to thereby mix the plurality of types of solutions and react them with each other instantaneously and efficiently using eddy viscosity.

Furthermore, in order to attain the above-described object, the present invention is a method for forming silver halide emulsion particles by blowing out an aqueous solution of silver salt and aqueous solution of haloid salt from their respective nozzles to a mixing chamber of a larger diameter than the diameters of the nozzles to allow the solutions to mix and react with each other and discharging the liquid resulting from the mixing and reaction from an outlet of a smaller diameter than the diameter of the mixing chamber, characterized in that one of the aqueous solution of silver salt and aqueous solution of haloid salt is blown out into the mixing chamber as a rectilinear flow of turbulent flow and at a position before eddy viscosity, which is formed when the rectilinear flow is blown out from the nozzle of a small diameter into the mixing chamber of a large diameter, reaches a maximum, the other liquid is blown out as a crossflow that crosses the rectilinear flow at a substantially right angle, and the one liquid and the other liquid are allowed to mix and react with each other instantaneously.

Furthermore, in order to attain the above-described object, the present invention is a method for forming silver halide emulsion particles by blowing out an aqueous solution of silver salt and aqueous solution of haloid salt from their respective nozzles to a mixing chamber of a larger diameter than the diameters of the nozzles to allow the solutions to mix and react with each other and discharging the liquid resulting from the mixing and reaction from an outlet of a smaller diameter than the diameter of the mixing chamber, characterized in that one of the aqueous solution of silver salt and aqueous solution of haloid salt is blown out into the mixing chamber as a rectilinear flow of turbulent flow and at a position before the rectilinear flow is reduced to $\frac{1}{10}$ or less of a maximum flow speed, the other liquid is blown out as a crossflow that crosses the rectilinear flow at a substantially right angle, and the one liquid and the other liquid are allowed to mix and react with each other instantaneously.

The present invention limits the plurality of types of solutions to an aqueous solution of silver salt and aqueous solution of haloid salt, blows out one of the aqueous solution of silver salt and aqueous solution of haloid salt into a mixing chamber as a rectilinear flow of turbulent flow and blows out the other liquid as a crossflow that crosses the above-described rectilinear flow at a substantially right angle at a position before eddy viscosity which is formed when the rectilinear flow is blown out from the nozzle of a small diameter into the mixing chamber of a large diameter reaches a maximum, to thereby allow a plurality of types of solutions to mix and react with each other using eddy viscosity instantaneously and efficiently, and can thereby form silver halide emulsion particles in small particle sizes and with an excellent mono-dispersion characteristic.

Furthermore, in order to attain the above-described object, the present invention is a method for forming silver halide emulsion particles by allowing an aqueous solution of silver salt and aqueous solution of haloid salt to mix and react with each other to form silver halide emulsion particles, characterized in that at an intermediate point of a first nozzle from which one of the aqueous solution of silver salt and aqueous solution of haloid salt is blown out as a rectilinear flow of turbulent flow, the other liquid is blown out from a second nozzle as a crossflow that crosses the rectilinear flow at a substantially right angle, merged with the rectilinear flow, then the rectilinear flow entrained by the crossflow is blown out into a mixing chamber of a larger diameter than that of the first nozzle to allow the one liquid and the other liquid to mix and react with each other and the liquid resulting from the mixing and reaction is discharged from a discharge port of a smaller diameter than that of the mixing chamber.

According to the method for forming silver halide emulsion particles that blows out a crossflow in the mixing chamber for the rectilinear flow blown out into the above-described mixing chamber, the flow speed at the time of blowout of the rectilinear flow blown out from the first nozzle into the mixing chamber as a high-speed flow decelerates every moment in units of mm in length, and it is desirable to blow out the crossflow in such a way that the flow speed of the rectilinear flow does not decelerate as much as possible. Furthermore, an eddy of highly concentrated aqueous solution of haloid salt or aqueous solution of silver nitrate is likely to occur in the vicinity of locations where the rectilinear flow and crossflow blown out into the mixing chamber collide with each other and this eddy generates a resident circulation flow, which constitutes a factor of reducing the mixing reaction performance.

The present invention blows out the other liquid from the second nozzle as a crossflow that crosses the rectilinear flow at a substantially right angle at an intermediate point of the first nozzle that blows out a rectilinear flow, merges it with the rectilinear flow, and then blows out the rectilinear flow entrained by the crossflow into a mixing chamber of a larger diameter than that of the first nozzle to thereby blow out the crossflow before the flow speed of the rectilinear flow decelerates as much as possible.

In order to attain the above-described object, the present invention provides a method for forming silver halide emulsion particles by blowing out an aqueous solution of silver salt and aqueous solution of haloid salt from their respective nozzles into a mixing chamber of a larger diameter than the diameters of the respective nozzles to allow the solutions to mix and react with each other and discharging the liquid resulting from the mixing and reaction from a discharge port of a smaller diameter than the diameter of the mixing chamber, characterized in that the aqueous solution of silver salt and aqueous solution of haloid salt are allowed to mix and react with each other instantaneously by blowing out the aqueous solution of silver salt and aqueous solution of haloid salt from one end to the other of the mixing chamber into the mixing chamber as at least two substantially-parallel rectilinear flows of turbulent flow.

Furthermore, in order to attain the above-described object, the present invention provides a method for forming silver halide emulsion particles by blowing out an aqueous solution of silver salt and aqueous solution of haloid salt from their respective nozzles into a mixing chamber of a larger diameter than the diameters of the respective nozzles to allow the solutions to mix and react with each other and discharging the liquid resulting from the mixing and reaction from a discharge port of a smaller diameter than the diameter of the mixing chamber, characterized in that the aqueous solution of silver salt and aqueous solution of haloid salt are allowed to mix and react with each other instantaneously by blowing out the aqueous solution of silver salt and aqueous solution of haloid salt from one end and the other of the mixing chamber into the mixing chamber as at least two rectilinear flows of turbulent flows opposite to each other.

The above-described method for forming silver halide emulsion particles is a so-called "one-jet system" that one jet flow which is a rectilinear flow of a high-speed turbulent flow is entrained by a crossflow of a low-speed turbulent flow that crosses the rectilinear flow at a substantially right angle to form eddy viscosity in the mixing chamber, but it is also possible to adopt a so-called "double-jet system" to form eddy viscosity in the mixing chamber using two jet flows.

The present invention is intended to form silver halide emulsion particles by allowing an aqueous solution of silver salt and aqueous solution of haloid salt to mix and react with each other based on the "double-jet system" and one mode as the "double-jet system" is to blow out at least two rectilinear flows from one end to the other of the mixing chamber, and another mode is to blow out at least two rectilinear flows from the directions opposite to each other of the mixing chamber.

Here, "fine particles" according to the present invention refer to particles smaller than minimum particles formed by an existing method, and generally refer to particles in size of 30 nm or less, or in some cases particles called "single nanoparticles" of 10 nm or smaller. Furthermore, "blowing out the other liquid into the mixing chamber as a crossflow that crosses the rectilinear flow at a substantially right angle" means that the crossflow can only be predominantly composed of an orthogonal velocity vector component even if the crossflow is not completely orthogonal to the rectilinear flow.

Furthermore, the rectilinear flow in the present invention is basically only one, whereas there can be a plurality of crossflows. For example, it is also possible to blow out a plurality of types of aqueous solution of silver salt with different concentrations of silver salt or types of silver salt (silver nitrate, silver iodide, etc.) as a plurality of crossbows for one rectilinear flow of an aqueous solution of haloid salt. In this case, a plurality of crossflow nozzle positions may be provided to blow out a plurality of types of aqueous solution of silver salt or a plurality of types of aqueous solution of silver salt may be blown out in order, in three stages of a reaction initial stage, reaction middle stage and reaction final stage. Therefore, though the first nozzle for the rectilinear flow is basically one, there can be a plurality of second nozzles for crossflows.

Instead of the conventional static mixing apparatus that makes a high-speed turbulent flow of an aqueous solution of silver nitrate and a high-speed turbulent flow of an aqueous solution of haloid salt collide with each other at an intersection of very narrow pipes such as a T-shaped pipe or Y-shaped pipe, allows the two solutions to mix and react with each other instantaneously at the site of collision, the present invention, focusing on eddy viscosity known as an evaluation of a mixing characteristic at a site of turbulent flow, adds, for example, a string-shaped rectilinear flow of the aqueous solution of haloid salt (or aqueous solution of silver salt) inside the static mixing apparatus and aqueous solution of silver salt (or aqueous solution of haloid salt) as a crossflow to the mixing chamber and uses eddy viscosity formed by being entrained by the rectilinear flow, and allows both liquids to mix and react with each other instantaneously to thereby form silver halide emulsion particles. Furthermore, the present invention forms not only silver halide emulsion particles but also fine particles with an excellent mono-dispersion characteristic from the two types of solutions.

That is, the present invention constructs a static mixing apparatus in such a way that in order to make eddy viscosity occur in the mixing chamber, a first nozzle and a second nozzle of a smaller diameter than the diameter of a cylindrical mixing chamber is formed in a mixer in which the mixing chamber is formed, eddy viscosity is formed by blowing out the liquid from the nozzle of a small diameter into the mixing chamber of a greater diameter, and the diameter of the discharge port is reduced to give a pressure to the mixing chamber to thereby prevent a gas-liquid interface from being formed in the mixing chamber by cavitation. When the jet flow output from the first nozzle is blown out into a place wider than the width of its flow, an eddy flow is generated by a turbulent flow and eddy viscosity is generated because there is a entrained flow from the second nozzle entrained by this eddy flow, making it possible to enhance the effect of mixing considerably, but this effect cannot be expected in the aforementioned T-shaped pipe or Y-shaped pipe whose diameter does not change.

Furthermore, focusing on the fact that when eddy viscosity is generated by a rectilinear flow by blowing out one of the aqueous solution of silver salt and aqueous solution of haloid salt from the first nozzle, eddy viscosity reaches a maximum at a blowing position a little distant from the first nozzle and the efficiency of mixing both liquids reaches a maximum at this position of maximum eddy viscosity, the present invention specifies the positional relationship between the first nozzle and second nozzle so that the crossflow which is the other liquid is blown out into the mixing chamber from the position before eddy viscosity reaches a maximum. The position where eddy viscosity reaches a maximum is determined by carrying out a simulation beforehand using "R-Flow", which is numerical analysis software created by Rflow Co., Ltd. and already commercially available to grasp the area where eddy viscosity appears, grasp this central point and determine from this point the position where the crossflow from the second nozzle is added on the jet nozzle side of the rectilinear flow.

Furthermore, the position where eddy viscosity reaches a maximum in the mixing chamber is substantially equivalent to the position where the maximum velocity of the rectilinear flow from the first nozzle is reduced to $1/10$, and therefore it is also possible to position the second nozzle so that the crossflow is blown out before the rectilinear flow is reduced to $1/10$ or below of the maximum flow speed.

Furthermore, in mixing the crossflow and rectilinear flow using eddy viscosity efficiently, it is desirable to set the jet flow speed of the crossflow at the time of blowout to a value equal to or smaller than the jet flow speed of the rectilinear flow at the time of blowout so that the crossflow is involved in the entraining flow which entrains the high-speed rectilinear flow.

Furthermore, the flow speed of the rectilinear flow can be reduced by blowing the rectilinear flow in a thin-film form. Thus, it is possible to suppress the generation of frictional heat caused by friction between liquids due to the rectilinear flow and suppress the growth through Ostwald maturation of formed particles. Furthermore, blowing the rectilinear flow in a thin-film form increases the area of the entraining interface, and therefore it is possible to obtain favorable mixing performance even if the jet flow speed of the rectilinear flow is low and highly concentrated aqueous solution of haloid salt and aqueous solution of silver nitrate are used. When the rectilinear flow is blown out in a thin-film form, it is more preferable to blow out the rectilinear flow substantially perpendicular to the plane of the thin film of the rectilinear flow and keep the rectilinear flow in a thin-film form.

Thus, since the present invention can optimize the mixing state at the static mixing apparatus, it is possible to form silver halide emulsion particles in small particle sizes and with an excellent mono-dispersion characteristic.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a schematic view illustrating eddy viscosity formed in a mixing chamber of the static mixing apparatus according to the first embodiment of the present invention;

DETAILED DESCRIPTION OF THE PREFERRED EMBODIMENTS

With reference now to the attached drawings, embodiments of a method and apparatus for forming silver halide emulsion particles according to the present invention will be explained in detail below. Although the following explanations will mainly describe the formation of silver halide emulsion particles, the present invention is also applicable to fine particles other than silver halide emulsion particles.

First Embodiment

In the first embodiment of the present invention, one of an aqueous solution of silver salt and aqueous solution of haloid salt is blown out into a mixing chamber as a rectilinear flow of turbulent flow and blows out the other of the aqueous solutions as a crossflow substantially-perpendicular to the rectilinear flow at a position before eddy viscosity, which is formed when the rectilinear flow is blown out from a nozzle of a small diameter into the mixing chamber of a large diameter, reaches a maximum.

Figure 1:
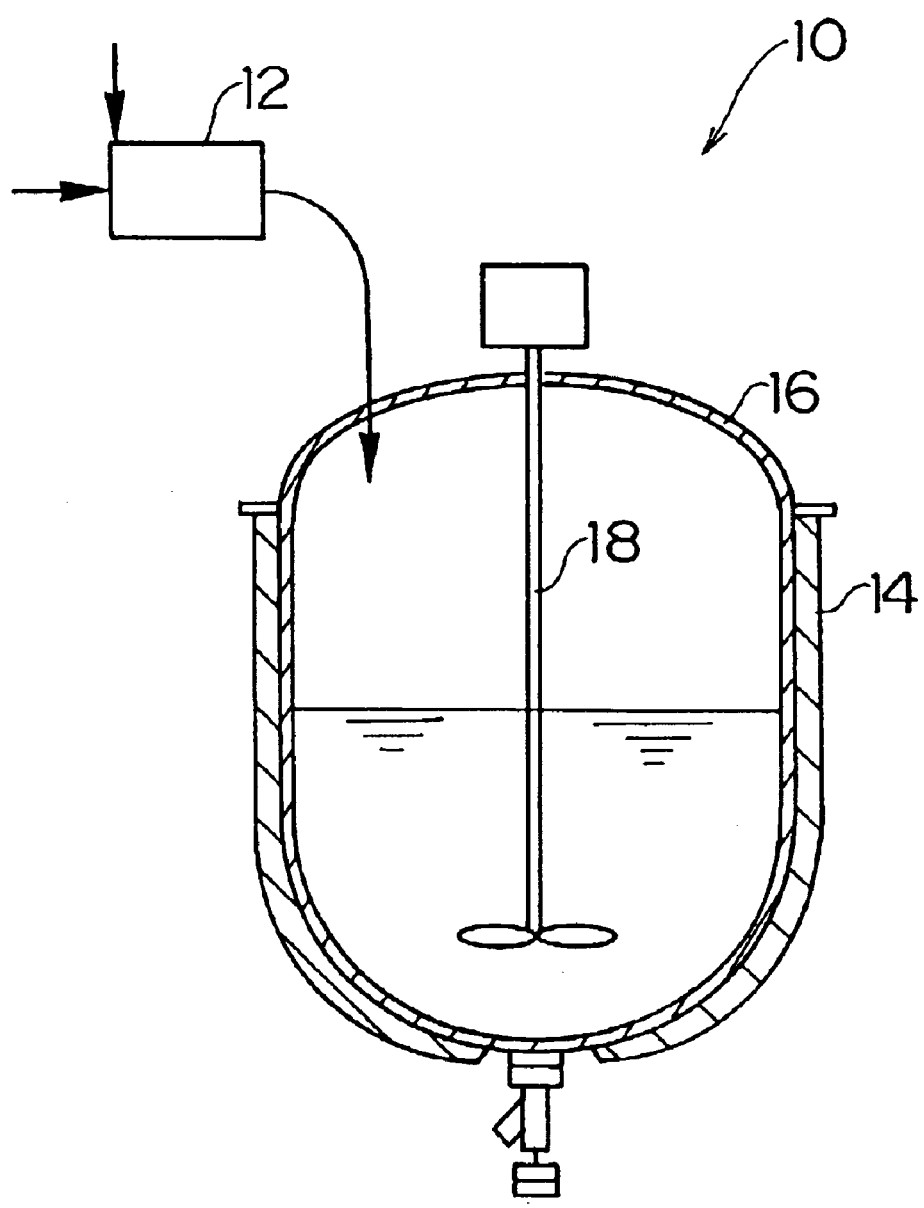
FIG. 1 is a conceptual diagram of a manufacturing line of a silver halide photosensitive material provided with a silver halide emulsion particles formation apparatus according to the first and second embodiments of the present invention.

FIG. 1 is a conceptual diagram of a manufacturing line 10 of a silver halide photosensitive material provided with a silver halide emulsion particles formation apparatus according to the present invention.

The manufacturing line 10 of a silver halide photosensitive material comprises a nucleus formation step of forming fine particle nuclei of silver halide emulsion particles and a nucleus growth step of letting fine particle nuclei grow by contacting the fine particle nuclei formed in the nucleus formation step with silver halide emulsion particles for growth. Then, a static mixing apparatus 12 which is a silver halide emulsion particle formation apparatus of the present invention is placed in the nucleus formation step and a growth tank 16 provided with a heating jacket 14 is placed in the nucleus growth step.

The static mixing apparatus 12 allows an aqueous solution of silver nitrate X and aqueous solution of haloid salt Y to mix and react with each other instantaneously to form a liquid Z resulting from the mixing and reaction including fine particle nuclei of silver halide emulsion particles and sends it to the growth tank 16 immediately. The fine particle nuclei sent to the growth tank 16 grows through Ostwald maturation while being stirred by a stirrer 18 in the solution of silver halide emulsion particles for growth. It is preferable to use the same static mixing apparatus as that used in the nucleus formation step for the formation of silver halide emulsion particles for growth in this nucleus growth step.

Figure 2:
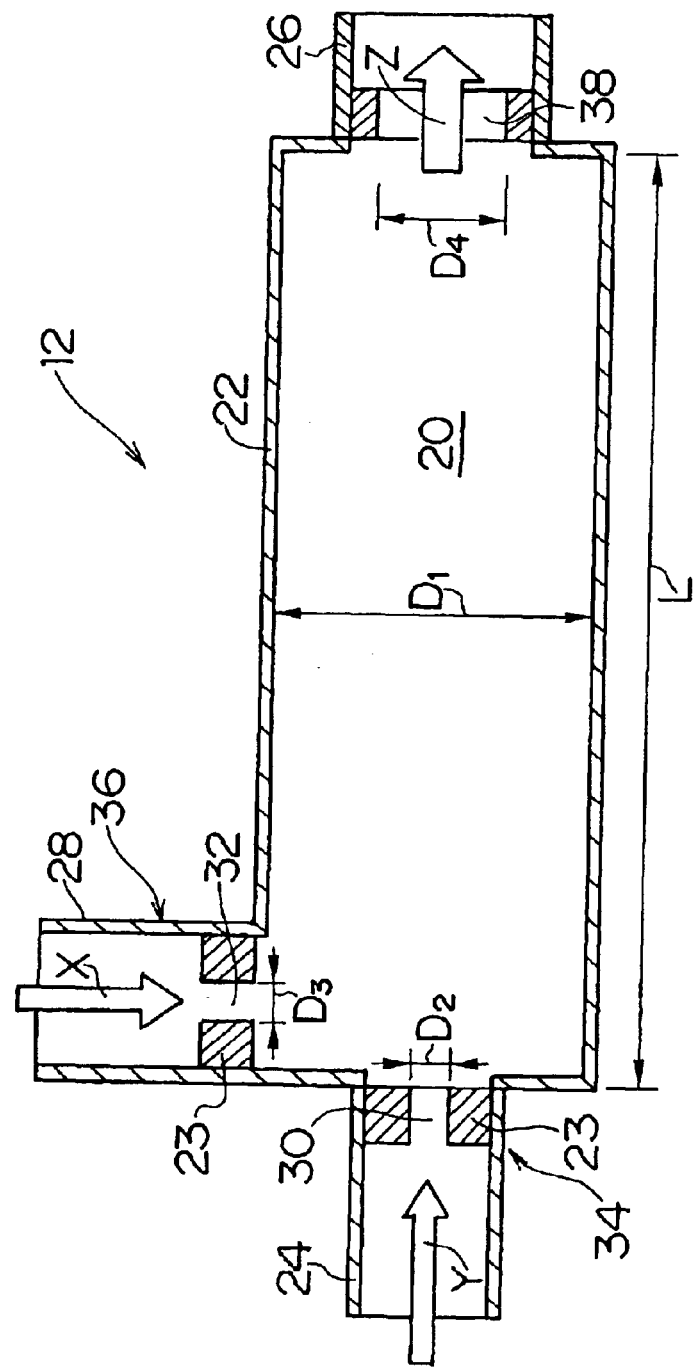
FIG. 2 is a conceptual diagram of a static mixing apparatus of the silver halide emulsion particles formation apparatus according to the first embodiment of the present invention.

FIG. 2 is a conceptual diagram showing a structure of the static mixing apparatus 12 according to the present invention.

As shown in FIG. 2, the static mixing apparatus 12 comprises a mixer 22 having a cylindrical mixing chamber 20, in which the aqueous solution of silver nitrate X and aqueous solution of haloid salt Y are allowed to mix and react with each other. An opening at one end of the mixing chamber 20 is connected to a first conduit 24, which introduces the aqueous solution of haloid salt Y into the mixing chamber 20. An opening at the other end of the mixing chamber 20 is connected to a discharge duct 26 of the liquid Z resulting from the mixing and reaction in the mixing chamber 20. Furthermore, near the outlet of the first conduit 24 on the side of the mixer 22, a second conduit 28 is connected which introduces the aqueous solution of silver nitrate X into the mixing chamber 20. According to this embodiment, the aqueous solution of haloid salt Y is introduced through the first conduit 24 and the aqueous solution of silver nitrate X is introduced through the second conduit 28, but the two aqueous solutions can also be switched round. Furthermore, the discharge duct 26 can also be connected to the side of the mixer 22 if it is near the other end of the mixer 22.

Inside the ends of the first conduit 24 and second conduit 28, a first orifice 30 and second orifice 32 are formed respectively, and in this way a first nozzle 34 and second nozzle 36 for blowing out liquids of turbulent flow are formed in the first conduit 24 and second conduit 28. As a method for making the first and second orifices 30 and 32 in block-shaped orifice materials 23, micro cutting, micro grinding, blasting, micro discharging, LIGA method, laser beam machining, and SPM machining, etc., which are publicly known methods for precisely making nozzles on the order of 100 μm in the orifice materials 23 such as metal, ceramics and glass, can be used preferably.

As the material of the orifice material 23, it is preferable to use a material with good workability and hardness similar to that of diamond. Various metals or metal alloys subjected to hardening such as quenching, nitriding and sintering can be used preferably as the material other than diamond. Furthermore, ceramics also has high hardness and excellent workability, and can therefore be used preferably. In this embodiment, an example of orifice is explained as a narrowing structure for the first nozzle 34 and second nozzle 36, but the structure is not limited to an orifice and other structure can be used if it has at least the function of blowing a liquid of turbulent flow.

Furthermore, the first conduit 24 and second conduit 28 are provided with pressurizing devices (not shown) whereby the aqueous solution of haloid salt Y and aqueous solution of silver nitrate X are pressurized and supplied to the first and second nozzles 34 and 36. As the device which applies a high pressure to the aqueous solutions, various devices are known and available, but it is desirable to use a reciprocating pump such as a plunger pump and booster pump as relatively easily available and economic devices. Furthermore, it is also possible to use a high-pressure generation type pump among rotary pumps though it cannot generate so a high pressure as the reciprocating pump.

Then, the aqueous solution of haloid salt Y is blown out from the first nozzle 34 as a rectilinear flow A of turbulent flow into the mixing chamber 20 and the aqueous solution of silver nitrate X is blown out from the second nozzle 36 as a crossflow B that crosses the rectilinear flow A at a substantially right angle into the mixing chamber 20 where two solutions are allowed to mix and react with each other to form the liquid Z resulting from the mixing and reaction including silver halide emulsion particles. In this case, even the crossflow B that does not cross the rectilinear flow A at an angle of 90 degrees is acceptable if it is at least predominantly composed of a perpendicular velocity vector component. Furthermore, in FIG. 2, the second nozzle 36 that blows out the crossflow B is placed on the upside of the mixer 22, but the second nozzle 36 may be placed on the underside or the side of the mixer 22, and the point is that the crossflow B can be blown out in a direction substantially perpendicular to the rectilinear flow A.

As schematically shown in FIG. 3, such mixing reaction is intended to achieve a high mixing efficiency by involving the crossflow B blown out from the direction substantially perpendicular to the rectilinear flow A in an entraining flow that entrains the high-speed rectilinear flow of turbulent flow and using large eddy viscosity generated by the mixing of the rectilinear flow A of turbulent flow with the crossflow B, and the above-described mixing chamber 20, the first and second nozzles 34 and 36, and discharge duct 26 of the static mixing apparatus 12 are formed with the following relationship.

That is, it is necessary to form eddy viscosity in the mixing chamber 20, and therefore a cylindrical diameter $D_1$ of the mixing chamber 20 is formed to be greater than an orifice diameter $D_2$ of the first nozzle 34 and an orifice diameter $D_3$ of the second nozzle 36. Especially, the eddy viscosity created by the rectilinear flow A is important in improving the mixing efficiency and the dimensional ratio of the diameter $D_1$ of the mixing chamber 20 to the orifice diameter $D_2$ of the first nozzle 34 is preferably in a range of 1.1 to 50 times, more preferably in a range of 1.1 to 20 times. Moreover, in order for the crossflow B to be easily involved in the rectilinear flow A, the jet flow speed of the crossflow B is preferably equal to or lower than the jet flow speed of the rectilinear flow A, and more specifically, it is 0.05 to 0.4 times, more preferably 0.1 to 0.3 times.

Furthermore, it is necessary to blow out the crossflow B into the mixing chamber 20 at a position before eddy viscosity C formed when the rectilinear flow A is blown out from the first nozzle 34 of a small diameter to the mixing chamber 20 of a larger diameter reaches a maximum, and place the second nozzle 36 between the first nozzle 34 and the maximum position of eddy viscosity C. It is hence necessary to know the position where eddy viscosity C reaches a maximum. It is possible to grasp the position of the mixing chamber 20 where eddy viscosity C reaches a maximum by carrying out a simulation beforehand using "R-Flow", which is well known numerical analysis software created by Rflow Co., Ltd. and is already commercially available. In this case, as is apparent from FIG. 3, the position where eddy viscosity C reaches a maximum is not a pinpoint but has a certain area, and therefore the maximum position of eddy viscosity C can be set to a point P which is substantially a center of eddy viscosity C. Therefore, the second nozzle 36 can be positioned before the point P, but it is more preferable to position the second nozzle so that the crossflow B can be blown in an initial stage of formation of eddy viscosity C.

When no mixing chamber 20 for forming viscosity C exists or when the positional relationship between the first nozzle 34 and second nozzle 36 is not appropriate, quite a long mixing space is required so that the rectilinear flow A is taken out from the mixing site before it is mixed entrained by the crossflow B which has been added at some midpoint or completely mixed, which increases the time interval between the first mixed one and the last mixed one, increasing the particle size distribution of silver halide emulsion particles.

The result of the above-described numerical analysis software shows the central point P of the area where eddy viscosity C appears is related to the flow speed of the rectilinear flow A and is substantially equivalent to the position where the maximum flow speed (normally flow speed at the position of the first nozzle) of the rectilinear flow A is reduced to $\frac{1}{10}$. Therefore, it is not necessary to calculate the point P if the position where the maximum flow speed of the rectilinear flow A is reduced to $\frac{1}{10}$ is calculated and then the second nozzle 36 is positioned so that the crossflow B can be blown out before the point.

It is necessary to secure a length L (see FIG. 2) of the mixing chamber 20 necessary to form the maximum eddy viscosity C in the mixing chamber 20, but if this is too long, the liquid resulting from the mixing and reaction Z is likely to remain in the mixing chamber 20 or flow backward, causing an adverse effect on the reduction in size of silver halide particles or the mono-dispersion characteristic. Hence, the length L of the mixing chamber 20 is preferably 2 to 5 times the distance from the first nozzle 34 to the maximum position of the eddy viscosity C, more preferably 2 to 3 times.

Furthermore, when a liquid is blown out from the first nozzle 34 and second nozzle 36 of a small diameter into the mixing chamber 20 of a larger diameter, it is likely to cause cavitation and this cavitation forms a gas-liquid interface and reduces a mixing efficiency. Hence, in order to increase the mixing efficiency using the eddy viscosity C, it is necessary to prevent any gas-liquid interface from being formed in the mixing chamber 20. Therefore, as shown in FIG. 2, it is necessary to narrow the diameter $D_4$ of the discharge duct 26 by the third orifice 38 so that it is smaller than the cylindrical diameter $D_1$ of the mixing chamber 20 and mix the liquids with the pressure of the mixing chamber 20 increased. This can eliminate cavitation and can thereby further improve the mixing efficiency. To minimize the residence period in the portion in the discharge duct 26 that does not contribute to the mixing, it is preferable to narrow the outlet in the mixing chamber 20, minimize the length of the discharge duct 26 of a smaller inner diameter than the cylindrical diameter $D_1$ of at least the mixing chamber 20 and connect it to the growth tank 16.

Furthermore, the shape of the jet flow output from the first nozzle 34 and second nozzle 36 into the mixing chamber 20 is regulated by the first and second orifices 30 and 32 and this shape of the jet flow affects the mixing performance. Therefore, it is preferable to use the first orifice 30 for forming various shapes of the jet flow such as string-shaped jet flow, cone-shaped jet flow, parallel-shaped thin-film jet flow or fan-shaped thin-film jet flow as appropriate according to the purpose of mixing and reaction. For example, in the case of a very high reaction speed on the order of milliseconds, it is necessary to blow out the rectilinear flow A and crossflow B so that the eddy viscosity C reaches a maximum within the narrowest possible range instantaneously and the first orifice 30 that forms a string-shaped jet flow is preferable. On the other hand, when the reaction speed is relatively low, it is preferable to blow out the rectilinear flow A and crossflow B so that the eddy viscosity C reaches a maximum within the widest possible range thereby increasing the area of an entraining interface created by the rectilinear flow A, and in this case, the first orifice 30 that forms a thin-film jet flow is preferable. Furthermore, in the case of a reaction speed intermediate between the very high reaction speed on the order of milliseconds and relatively low reaction speed, the first orifice 30 that forms a cone-shaped jet flow is preferable.

FIGS. 4(a) to 4(c), 5(a) to 5(c), 6(a) to 6(c), and 7(a) to 7(c) illustrate orifices to form a string-shaped jet flow, cone-shaped jet flow, parallel-shaped thin-film jet flow and fan-shaped thin-film jet flow, respectively, and each (a) in the figures shows the orifice seen from an end of the orifice, each (b) is a longitudinal sectional view of the orifice and each (c) is a cross-sectional view of the orifice.

Figure 4A:
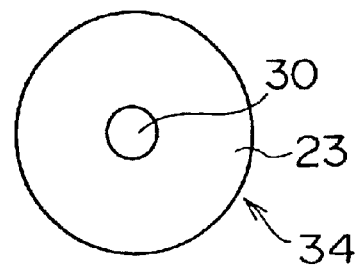
FIGS. 4(a) to 4(c) illustrate the shape of an orifice forming a string-shaped jet flow.
Figure 4B:
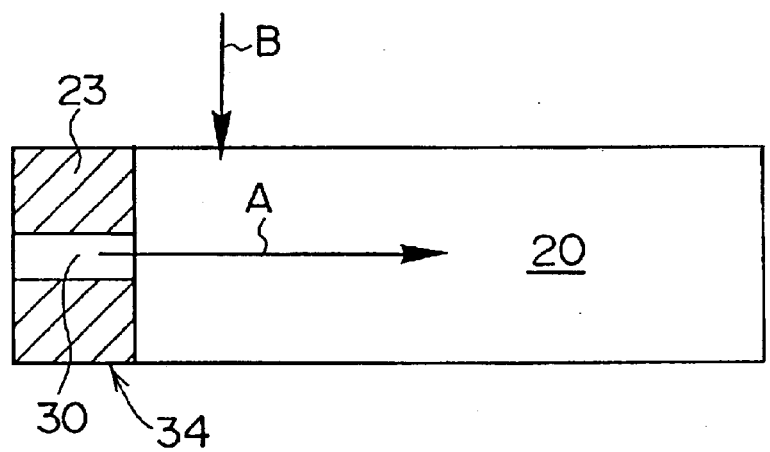
Figure 4C:
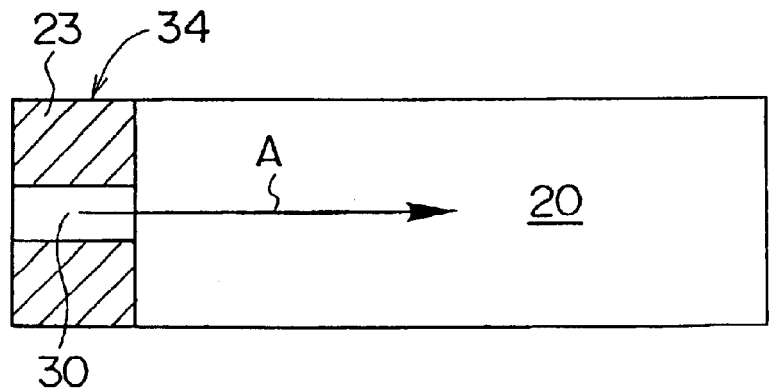
Figure 5A:
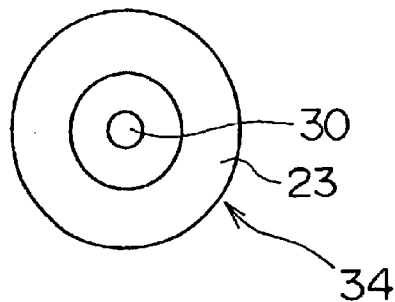
FIGS. 5(a) to 5(c) illustrate the shape of an orifice forming a cone-shaped jet flow.
Figure 5B:
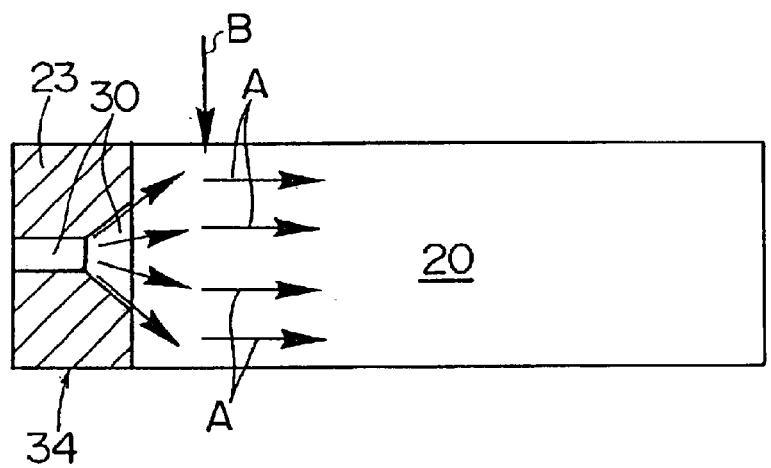
Figure 5C:
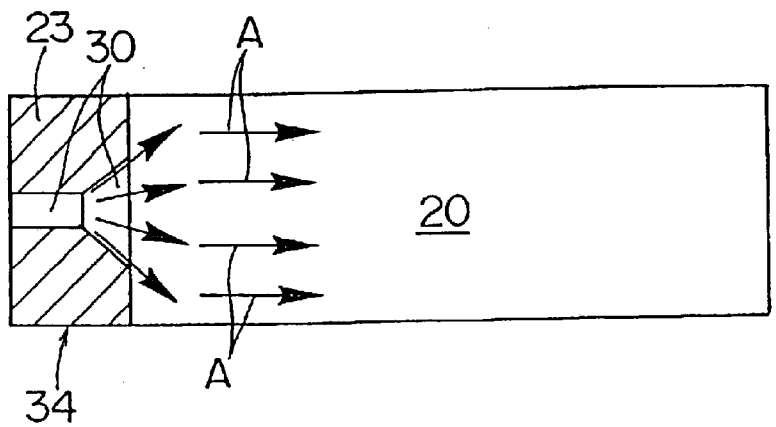
Figure 6A:
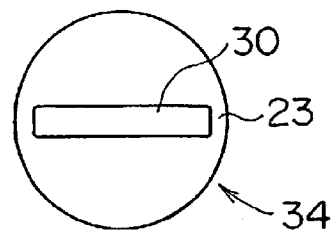
FIGS. 6(a) to 6(c) illustrate the shape of an orifice forming a parallel-shaped thin-film jet flow.
Figure 6B:
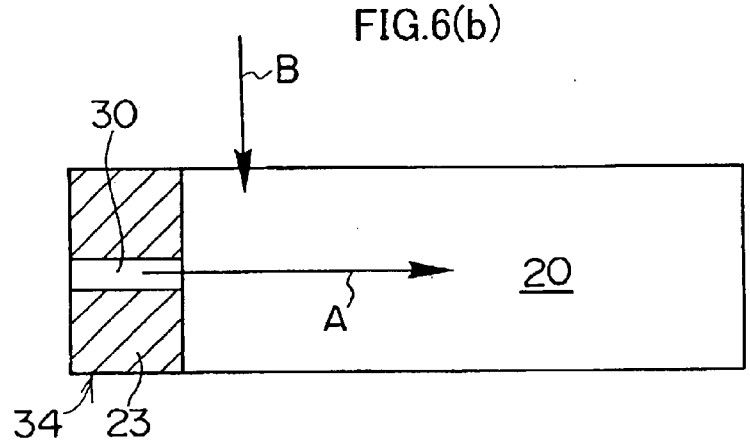
Figure 6C:
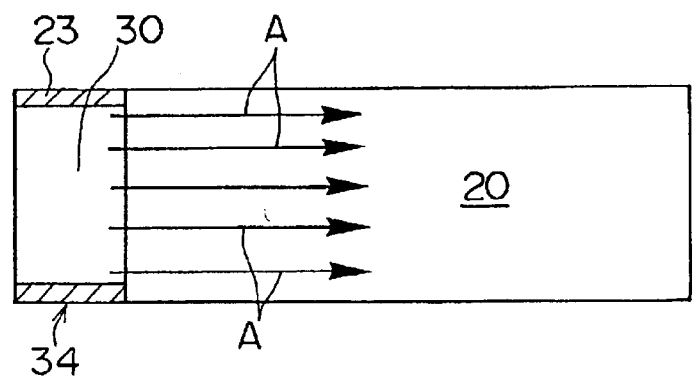
Figure 7A:
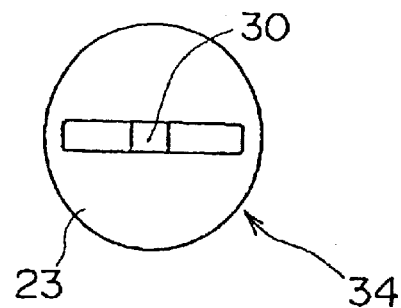
FIGS. 7(a) to 7(c) illustrate the shape of an orifice forming a fan-shaped thin-film jet flow.
Figure 7B:
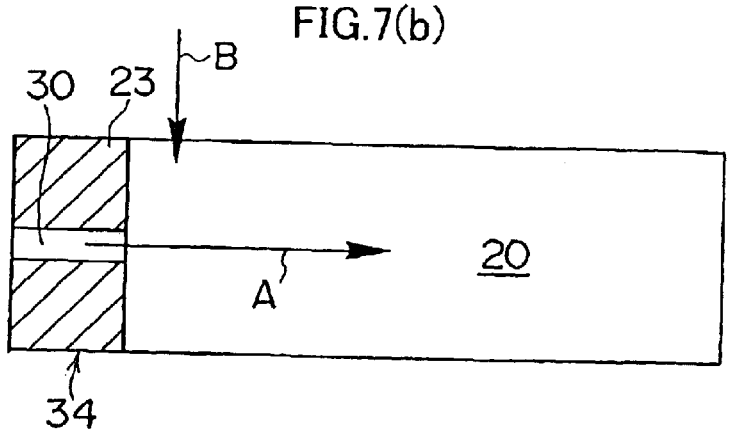
Figure 7C:
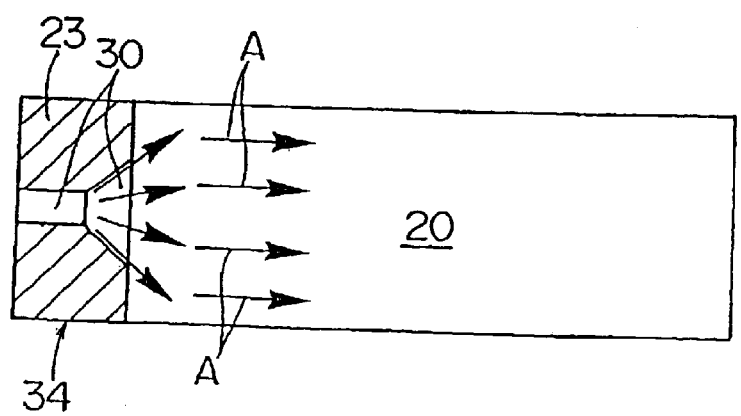

FIGS. 4(a) to 4(c) show the first orifice 30 to blow out the string-shaped rectilinear flow A into the mixing chamber 20 and it is formed in a straight string shape. FIGS. 5(a) to 5(c) show the first orifice 30 to blow out the cone-shaped rectilinear flow A into the mixing chamber 20 and it is formed in a funnel shape having an open end. FIGS. 6(a) to 6(c) show the first orifice 30 to blow out the parallel-shaped thin-film rectilinear flow A into the mixing chamber 20 and it is formed in a rectangular slit shape. FIGS. 7(a) to 7(c) show the first orifice 30 to blow out the fan-shaped thin-film rectilinear flow A into the mixing chamber 20 and it is formed with its end expanded in a fan shape.

With respect to a Reynolds number in the case where the section of a conduit is not circular as in the case of the first orifice 30 shown in FIGS. 6(a) to 6(c), "General Theory of Chemical Engineering" (by Haruo Hikita, Asakura Shoten) shows that such a Reynolds number can be treated as follows. That is, an equivalent diameter De is defined as $$De=4S/lp,$$

where S is "cross section", and lp is "length of the periphery of a solid wall contacting a fluid". Since the slit-shaped orifice has a closed-groove structure, lp can be expressed as $$lp=2(a+b),$$

where a is the short side, and b is the long side. Therefore, the equivalent diameter De is expressed as $$De=4(ab)/2(a+b)=2ab/(a+b). \tag{1}$$

When a turbulent flow expressed in the present invention is calculated, the De calculated by Formula (1) is used as the circle-equivalent diameter.

Then, a method for forming silver halide emulsion particles using the static mixing apparatus 12 in the above-described configuration will be explained.

The aqueous solution of haloid salt Y is blown out from the first nozzle 34 as the rectilinear flow A of turbulent flow into the mixing chamber 20, and the aqueous solution of silver nitrate X is blown out from the second nozzle 36 as the crossflow B that crosses the rectilinear flow A at a substantially right angle to entrain the rectilinear flow A at a position before eddy viscosity C formed when the rectilinear flow A is blown out from the first nozzle 34 of a small diameter into the mixing chamber 20 of a larger diameter, reaches a maximum, or at a position before the maximum flow speed of the rectilinear flow A is reduced to $\frac{1}{10}$ or below, and the two solutions are thereby allowed to mix and react with each other instantaneously and the liquid resulting from the mixing and reaction Z is discharged from the discharge duct 26.

For the mixing and reaction using such eddy viscosity C, there are two methods for improving the mixing and reaction characteristic in the mixing chamber 20.

The first method is the one that the rectilinear flow A is blown out as a string-shaped high-speed flow so that the eddy viscosity C reaches a maximum instantaneously within the narrowest possible range. For this purpose, it is preferable to use the first orifice 30 that forms the string-shaped jet flow in FIGS. 4(a) to 4(c) as the first orifice 30 of the first nozzle 34 that blows out the rectilinear flow A.

From the standpoint of mixing, the rectilinear flow A is preferably a high-speed flow, but to control this reaction product to a desired particle size and size distribution, it is necessary to consider the influence of the frictional heat of liquid-liquid friction generated by the high-speed flow on the reaction. As such a measure, it is effective to decrease the temperature of the reaction liquid beforehand, or adopt a double structure for the added ducts, orifice section, mixing chamber section and discharge section to cool these sections or carry out both. Furthermore, since the high-speed flow is determined by a jet pressure added in accordance with the flow speed of the jet and the inner diameter of the first orifice 30, creating a faster flow requires the inner diameter of the first orifice 30 to be minimized and the pressure on the liquid to be increased. Therefore, the faster the flow, the more problematic the abrasion of the first orifice 30 becomes, but this can be handled by using diamond with excellent durability, etc.

The second method is the one that the rectilinear flow A is formed in a thin-film jet flow shape to increase the area of the entraining interface created by the rectilinear flow A. For this purpose, it is preferable to use the first orifice 30 that forms the parallel-shaped thin-film jet flow or fan-shaped thin-film jet flow shown in FIGS. 6(a) to 6(c) and FIGS. 7(a) to 7(c) as the first orifice 30 of the first nozzle 34 that blows out the rectilinear flow A. In this case, it is necessary to adjust the jet flow speed of the crossflow B so that the crossflow B does not break the thin film of the rectilinear flow A. More preferably, the second orifice 32 of the second nozzle 36 is also formed as shown in FIGS. 6(a) to 6(c) and FIGS. 7(a) to 7(c) so that the crossflow B is also a parallel-shaped thin-film jet flow or fan-shaped thin-film jet flow as in the case of the rectilinear flow A.

This second method can secure a larger area of eddy viscosity, and can thereby obtain favorable mixing performance even if the jet flow speed of the rectilinear flow A is smaller than the case of the string-shaped jet flow shape. This improves the durability characteristic of the first and second orifices 30 and 32, which allows the orifices to be created with metal with good workability, metal processed product, ceramics, etc., reduces the flow speed of the rectilinear flow and thereby suppresses generation of frictional heat, which allows finer silver halide emulsion particles to be formed.

In this way, the static mixing apparatus 12 according to the present invention is constructed based on an unprecedented concept and using this static mixing apparatus 12 can produce the effects as follows:

(1) Adopting a structure of generating eddy viscosity for the static mixing apparatus makes it possible to obtain an optimum mixing and reaction state in static mixing, and thereby form fine silver halide particles with an excellent mono-dispersion characteristic.

(2) By conducting mixing and reaction using eddy viscosity, it is possible to obtain good mixing performance even if the jet flow speed of the aqueous solution of haloid salt Y or aqueous solution of silver nitrate X is reduced, and therefore the jet pressure can be reduced. This improves the ease of manufacturing the device, stability and maintainability. Especially, it is possible to change the material of the first and second orifices 30 and 32 to any low-cost material with excellent workability other than diamond.

(3) At least adopting a thin-film rectilinear flow and blowing out the flow allows the highly concentrated aqueous solution of haloid salt Y and aqueous solution of silver nitrate X to mix and react with each other. This makes it possible to form seed particles of silver halide emulsion particles and allow the seed particles to grow at an industrially profitable, high concentration level. This is especially suited to forming silver halide emulsion particles in the particle growth step of allowing the highly concentrated aqueous solution of haloid salt Y and aqueous solution of silver nitrate X to mix and react with each other.

(4) Furthermore, by adopting at least a thin-film rectilinear flow and blowing out the flow, it is possible to reduce the jet flow speed of the aqueous solution of haloid salt Y and aqueous solution of silver nitrate X, and thereby suppress the generation of frictional heat by liquid-liquid friction. Especially when forming fine seed particles in the nucleus formation step, this prevents Ostwald maturation from occurring and makes it possible to form silver halide emulsion particles in smaller sizes.

One example of application of the present invention to other materials is semiconductor fine particles. The progress in the semiconductor industry is so remarkable that it is now impossible to imagine almost any apparatuses and systems without semiconductors. Though the mainstream of today's semiconductors is silicon, compound semiconductors are attracting attention in recent years out of necessity for speed enhancement, etc. For example, in the field of opto-electronics, compound semiconductors play the main role and in studies of light-emitting elements, photoelectric converting elements, various kinds of laser, nonlinear optical elements, etc., studies related to compound semiconductors occupy the majority of them. For example, it is known that II–VI group compounds combining II group elements like Zn and Cd and VI group elements like O and S have an excellent light-emitting (fluorescent) characteristic and their application to various fields is seen with expectation. Adopting the method for forming fine particles according to the present invention makes it possible to manufacture these semiconductor fine particles with an excellent mono-dispersion characteristic. For example, by replacing the above-described aqueous solution of silver salt and aqueous solution of haloid salt by a solution containing II group elements and a solution containing VI group elements and optimizing conditions, it is possible to form fine particles of II–VI group compound fine particles having particle sizes of 10 $\mu$m or less.

EXAMPLE 1

Example 1 is a test conducted using the static mixing apparatus shown in FIG. 2 with the rectilinear flow at a high jet flow speed.

That is, the static mixing apparatus 12 was constructed by providing the first nozzle 34 provided with the first orifice 30 having a diameter of 0.2 mm that blows out a sting-shaped rectilinear flow at one end of the mixer 22 in which the mixing chamber 20 having a cylindrical length of 3 mm and a length of 20 mm is formed and connecting the discharge duct 26 provided with a third orifice 38 having a diameter of 1.2 mm at the other end of the mixer 22. Then, a simulation was conducted beforehand using the above-described numerical analysis software R-Flow to grasp the area where eddy viscosity C would appear, this central point P (see FIG. 3) was found, the second nozzle 36 including the second orifice 32 having a diameter of 0.6 mm was provided at a position 2 mm from the outlet of the first nozzle 34 on the first nozzle 34 side from this point P. Then, as the rectilinear flow A of turbulent flow from the first nozzle 34, an aqueous solution of potassium bromide of 1.2826 mol/L (containing 1% gelatin as protective colloid) was blown out into the mixing chamber 20 at a room temperature (25° C.) and an aqueous solution of silver nitrate of 1.2826 mol/L was blown out as the crossflow B of turbulent flow from the second nozzle 36 into the mixing chamber 20 at a room temperature (25° C.). Furthermore, the jet flow speed of the rectilinear flow A was set to approximately 233 m/sec, the jet pressure was set to approximately 30 MPa and the jet flow speed of the crossflow B was set to approximately 25 m/sec and the jet pressure was set to approximately 0.27 MPa.

As a comparative example, in order to confirm the mixing performance by blowing out the crossflow B after the eddy viscosity of the rectilinear flow A reaches a maximum, a pre-chamber 50 of a cylindrical diameter of 2 mm and a length of 6 mm was provided between the first nozzle 34 and mixing chamber 20 and the static mixing apparatus with the first nozzle 34 separated from the second nozzle 36 by 8 mm was created, and this static mixing apparatus was compared with the static mixing apparatus of the example.

The silver halide emulsion particles formed using the static mixing apparatuses of the example and comparative example were frozen drastically with liquid nitrogen and their particle sizes were measured using an electron microscope. As a result, the average particle size of the silver halide emulsion particles formed by the static mixing apparatus of the example was 7.1 nm and showed a marked mono-dispersion characteristic. On the other hand, the average particle size of the silver halide emulsion particles formed by the static mixing apparatus of the comparative example was 20.1 nm and showed a greater particle size distribution than that of the example.

To elucidate why such a large difference occurs, the cause was analyzed using the above-described numerical analysis software R-Flow. As the analysis items, jet flow speed, jet pressure, eddy viscosity and mixing state were analyzed. As the method of this analysis, a dynamic area separation method was used to create mesh, SIMPLE was used as an analysis algorithm and k-$\epsilon$ method was used as the turbulent flow model. Then, the analysis results of the example are shown in FIGS. 8(a) to 8(d) and the analysis results of the comparative example are shown in FIGS. 9(a) to 9(d).

Figure 8A:
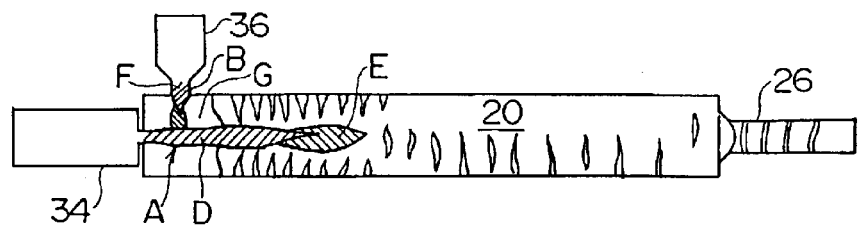
FIGS. 8(a) to 8(d) illustrate results of analysis of eddy viscosity, etc., when the static mixing apparatus according to an example in Example 1 is used.
Figure 8B:
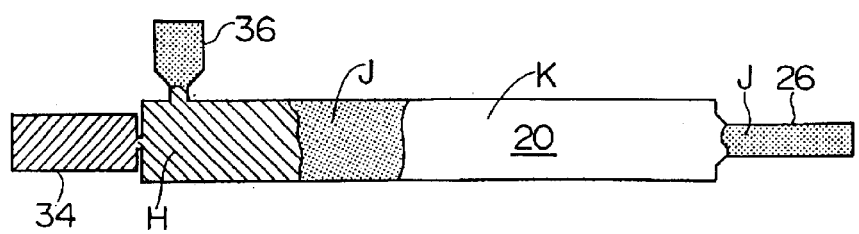
Figure 8C:
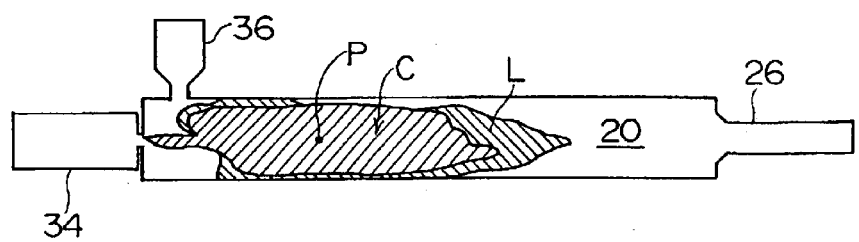
Figure 8D:
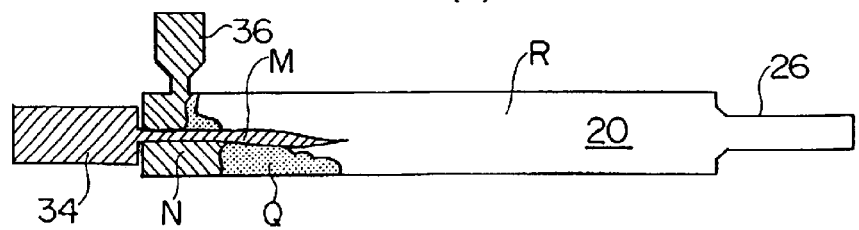

As is apparent from the analysis results of FIGS. 8(a) to 8(d) and FIGS. 9(a) to 9(d), the rectilinear flow A of the example of FIG. 8(a) maintains a high-speed flow speed D equivalent to that at the time of blowout until the crossflow B is blown out and becomes attenuated flow speed E around approximately ¼ of the mixing chamber. On the other hand, the crossflow B collides with the rectilinear flow A at a flow speed F which is slower than the rectilinear flow A and is then involved in an entraining flow G which is entrained by the high-speed rectilinear flow A. Furthermore, FIG. 8(b) shows the pressure distribution and the inner pressure of the mixing chamber increases at the outlet of the mixing chamber because its diameter is narrowed by the discharge duct 26, and the inner pressure is high (H) in the area where the crossflow contacts the rectilinear flow, which suppresses the generation of cavitation generated by the high-speed rectilinear flow to an extreme degree and can thereby maintain not a gas-liquid but liquid-liquid reaction field. In FIG. 8(c), the rectilinear flow of turbulent flow and the crossflow introduced into the mixing chamber are entrained by the rectilinear flow and it is possible to observe eddy viscosity indicated by L or C in the figure. C indicates a relatively strong eddy viscosity area and L indicates a relatively weak eddy viscosity area. Furthermore, point P in the figure indicates the central point of the eddy viscosity area. As a result, as is apparent from FIG. 8(d), a concentrated portion M of the aqueous solution of haloid salt of the rectilinear flow A, a concentrated portion N of the aqueous solution of silver nitrate X of the rectilinear flow A and a portion Q where both liquids start to mix exist only in the mixing chamber portion immediately after the jet from the first and second nozzles 34 and 36 and a mixing completion area R where the rectilinear flow A and crossflow B are completely mixed is formed in the subsequent mixing chamber portion up to the discharge duct 26.

Figure 9A:
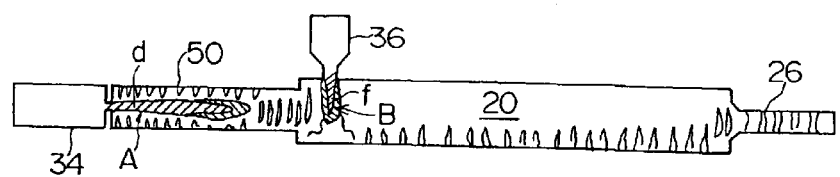
FIGS. 9(a) to 9(d) illustrate results of analysis of eddy viscosity, etc., when the static mixing apparatus according to a comparative example in Example 1 is used.
Figure 9B:
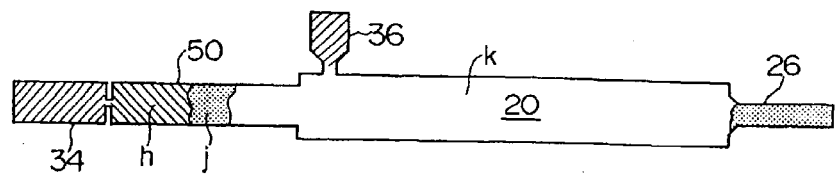
Figure 9C:
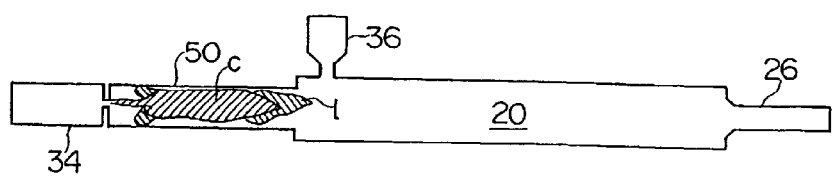
Figure 9D:
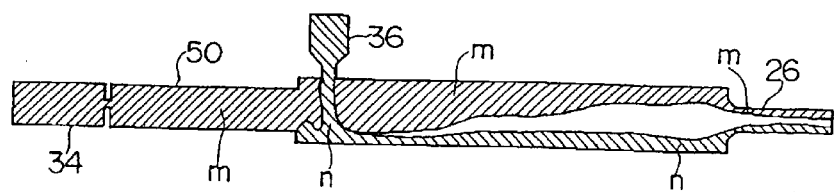

On the other hand, according to the comparative example in FIG. 9(a), a high-speed flow speed d at the time of blowout of the rectilinear flow A attenuates in the stage of a pre-chamber 50 failing to keep a flow speed enough to entrain the crossflow B when the crossflow B is blown out. Furthermore, in the pressure distribution in FIG. 9(b), a high-pressure h ends in the stage of the pre-chamber 50 and cavitation is likely to occur in the mixing chamber 20. Thus, as shown in FIG. 9(c), the magnitude of the eddy viscosity C is considerably small compared to the example and the eddy viscosity C ends in the stage of the pre-chamber 50. As a result, as is apparent from FIG. 9(d), a concentrated portion m of the aqueous solution of haloid salt of the rectilinear flow A and a concentrated portion n of the aqueous solution of silver nitrate X of the crossflow B continue up to the discharge duct 26 and there is only a tiny portion of a mixing completion area r, which shows that the mixing is incomplete.

Thus, the result of an analysis using the numerical analysis software R-Flow shows that by blowing out the crossflow before the central point P of the area where eddy viscosity formed by the rectilinear flow in the mixing chamber emerges, it is possible to achieve favorable mixing performance. Furthermore, as is apparent from the experiment results and simulation results, in the case of high pressure and high flow speed, it is observed that there are very limited singular points for demonstrating its mixing performance to a maximum degree.

EXAMPLE 2

Example 2 is a test conducted with the jet flow speed of the rectilinear flow A reduced to approximately ¼ of that of Example 1.

That is, Example 1 showed an example of blowing out the rectilinear flow A at a high flow speed of approximately 233 m/sec and since the rectilinear flow A was high speed in Example 1, frictional heat due to liquid-liquid friction was observed in addition to heat of reaction of the aqueous solution of silver nitrate and aqueous solution of haloid salt.

Thus, in Example 2, the jet flow speed of the rectilinear flow A was reduced from approximately 233 m/sec to approximately 58 m/sec. Items other than the jet flow speed of the rectilinear flow A were the same as those in Example 1.

Surprisingly, the result showed that even though the jet flow speed of the rectilinear flow A was reduced to approximately ¼ of that in Example 1, the average particle size of the formed silver halide emulsion particles was 7.6 nm with an excellent mono-dispersion characteristic, which was a good result comparable to the result in Example 1. Though not shown, a cause analysis was also conducted in Example 2 using the numerical analysis software R-Flow as in the case of Example 1. The result shows that though the magnitude of eddy viscosity C is small compared to Example 1, a mixing completion area where the rectilinear flow and crossflow are completely mixed is observed after the last half of the mixing chamber.

One possible reason that the average particle size of silver halide emulsion particles can be kept small even if the jet flow speed of the rectilinear flow A is reduced is that since the static mixing apparatus 12 of the present invention utilizes the eddy viscosity C, high mixing performance can be maintained even if the rectilinear flow A is slowed down. Another possible reason is that when the rectilinear flow A is fast, fine particles can be formed instantaneously, but Ostwald maturation due to frictional heat also occurs resulting in a particle size similar to that in the case of low speed.

As shown above, the results of Example 1 and Example 2 proved that using the static mixing apparatus 12 taking advantage of the eddy viscosity C as in the case of the silver halide emulsion particle formation apparatus of the present invention, it is possible to reduce frictional heat at the time of mixing of the aqueous solution of silver nitrate and aqueous solution of haloid salt, prevent the generation of cavitation and allow mixing and reaction to take place efficiently, optimize the mixing state in static mixing and thereby form silver halide emulsion particles in small particle sizes and with an excellent mono-dispersion characteristic.

Especially, as shown in the result of Example 2, favorable mixing performance was obtained though the jet flow speed of the rectilinear flow was reduced.

EXAMPLE 3

<Preparation of Dispersion Target>

Using solutions 1 and 2 shown in Table 1 and the mixing apparatus described in Example 1, ZnS fine particles A were formed.

TABLE 1

| Compound | Solution 1 (rectilinear flow) | Solution 2 (crossflow) |
| --- | --- | --- |
| Zinc acetate dihydrate | 22 g | |
| Sodium sulfide nonahydrate | | 24.7 g |
| Dodecylbenzene sodium sulfonate | | 7.0 g |
| Water | 2000 ml | 1000 ml |
| Methanol | | 1000 ml |

The solution 1 was introduced through the first nozzle 34 of FIG. 2 into the mixer as a jet flow. The flow speed of the solution 1 (rectilinear flow) at the time of introduction was set to 360 m/sec. At the same time, the solution 2 was introduced through the second nozzle 36. The flow speed of the solution 2 (crossflow) at the time of introduction was set to 3.6 m/sec. Furthermore, as a comparative example, as in the case of Example 1, ZnS fine particles B were formed in the same way as ZnS fine particles A except using a mixing apparatus whose first nozzle is separated from the second nozzle by 8 mm.

<Evaluation of Particle Diameter and Size Distribution>

The obtained fine particles were photographed using a transmission electron microscope to measure the average particle diameter and size distribution per approximately 150 fine particles. The size distribution is shown as a coefficient of variation in Table 2 together with particle diameters.

TABLE 2

| | ZnS fine particle | Average particle diameter | Standard deviation |
| --- | --- | --- | --- |
| Present invention | A | 2.9 nm | 0.58 |
| Comparative example | B | 3.4 nm | 0.65 |

As is apparent from the result of Table 2, the present invention was successful in obtaining semiconductor fine particles in smaller sizes than the comparative example and with a mono-dispersion characteristic.

Second Embodiment

The second embodiment adopts a thin-film shape for the rectilinear flow of the first embodiment and the rest of the configuration is completely the same as that of the first embodiment, and therefore explanations thereof will be omitted and only examples will be explained.

EXAMPLE 4

Example 4 is a test conducted using the static mixing apparatus shown in FIG. 2 with the jet flow speed of the rectilinear flow A set to a high speed of approximately 223 m/sec and with highly concentrated aqueous solution of haloid salt and aqueous solution of silver nitrate.

That is, the static mixing apparatus 12 was constructed by providing the first nozzle 34 with the first orifice 30 having a diameter of 0.2 mm that introduces a sting-shaped rectilinear flow A at one end of the mixer 22 in which the mixing chamber 20 having a cylindrical length of 3 mm and a length of 20 mm is formed and connecting the discharge duct 26 with the third orifice 38 having a diameter of 1.2 mm in diameter at the other end of the mixer 22. Then, a simulation was conducted beforehand using the above-described numerical analysis software R-Flow to grasp the area where eddy viscosity C would appear, this central point P (see FIG. 3) was found, the second nozzle 36 including the second orifice 32 having a diameter of 0.6 mm was provided at a position of 0.5 mm from the outlet of the first nozzle 34 on the first nozzle 34 side from this point P. As the rectilinear flow A of turbulent flow from the first nozzle 34, an aqueous solution of potassium bromide of 2.2 mol/L (containing 1% gelatin as protective colloid with liquid viscosity of 10 Cp) was blown out into the mixing chamber 20 at a room temperature (25° C.) and an aqueous solution of silver nitrate of 2.2 mol/L was blown out as the crossflow B of turbulent flow from the second nozzle 36 into the mixing chamber 20 at a room temperature (25° C.). Furthermore, the jet flow speed of the rectilinear flow A was set to approximately 233 m/sec, the jet pressure was set to approximately 30 MPa and the jet pressure of the crossflow B was set to approximately 25 m/sec and the jet pressure was set to approximately 0.27 MPa.

Then, the silver halide emulsion particles formed were frozen drastically with liquid nitrogen and their particle sizes were measured using an electron microscope. As a result, the average particle size of the silver halide emulsion particles was 10.5 nm.

Furthermore, the temperature of the liquid resulting from the mixing and reaction discharged from the discharge duct 26 was measured and the result confirmed that there was a temperature rise of approximately 7° C. compared to the temperature of the aqueous solution of haloid salt and aqueous solution of silver nitrate before they were blown out into the mixing chamber 20 due to viscosity of reaction and frictional heat.

EXAMPLE 5

Example 5 is a test conducted with the jet flow speed of the rectilinear flow A reduced to approximately 1/10 of that in Example 1 and the concentration of the aqueous solution of haloid salt and aqueous solution of silver nitrate reduced to approximately ½ of that in Example 1 by blowing out a thin-film shaped rectilinear flow A from the first nozzle 34.

To form the thin-film shaped rectilinear flow A, the first orifice 30 of the first nozzle 34 was slit-shaped as shown in FIGS. 6(a) to 6(c) and the dimensions of the slit-shaped orifice were set to 0.6 mm thick and 2.0 mm wide. Furthermore, the jet flow speed of the rectilinear flow A was reduced to approximately 22 m/sec and the jet flow speed of the crossflow B was also reduced to approximately 15 m/sec so that it would not break the thin film of the rectilinear flow A. Then, as the rectilinear flow A of turbulent flow from the first nozzle 34, an aqueous solution of potassium bromide of 1.0 mol/L (containing 1% gelatin as protective colloid with liquid viscosity of 10 Cp) was blown out into the mixing chamber 20 at a room temperature (25° C.) and an aqueous solution of silver nitrate of 1.0 mol/L was blown out as the crossflow B of turbulent flow from the second nozzle 36 into the mixing chamber 20 at a room temperature (25° C.).

As a result, the temperature of the liquid resulting from the mixing and reaction discharged from the discharge duct 26 was measured and the result confirmed that there was a temperature rise of only approximately 1° C. compared to the temperature of the aqueous solution of haloid salt and aqueous solution of silver nitrate before they were blown out into the mixing chamber 20. Then, the average particle size of the formed silver halide emulsion particles was as small as 8.5 nm and showed a marked mono-dispersion characteristic despite the reduced flow speed of the rectilinear flow A.

EXAMPLE 6

Example 6 is a test conducted with the same low jet flow speed of the thin-film shaped rectilinear flow A as that of Example 5 and the concentration of the aqueous solution of haloid salt and aqueous solution of silver nitrate X kept as high as that of Example 1.

That is, as the rectilinear flow A of turbulent flow from the first nozzle 34, an aqueous solution of potassium bromide of 2.2 mol/L (containing 1% gelatin as protective colloid with liquid viscosity of 10 Cp) was blown out into the mixing chamber 20 at a room temperature (25° C.) and an aqueous solution of silver nitrate X of 2.2 mol/L was blown out as the crossflow B of turbulent flow from the second nozzle 36 into the mixing chamber 20 at a room temperature (25° C.). Furthermore, assuming that the position of the second nozzle 36 of the crossflow B is the same as that of Example 2, the dimensions of the slit-shaped orifice of the first nozzle 34 were calculated so that the eddy viscosity C would reach a maximum and set to 0.58 mm thick and 2.0 mm wide.

When the temperature of the liquid resulting from the mixing and reaction discharged from the discharge duct 26 was measured, it confirmed that there was a temperature rise of only approximately 2° C. compared to the temperature of the aqueous solution of haloid salt and aqueous solution of silver nitrate before they were blown out into the mixing chamber 20. Then, the average particle size of the formed silver halide emulsion particles was as small as 8.6 nm and showed a marked mono-dispersion characteristic.

From the results of above-described Examples 4 to 6, it has been proven that adopting a parallel-shaped thin-film jet flow or fan-shaped thin-film jet flow for the rectilinear flow A will make it possible to form silver halide emulsion particles in sufficiently small sizes even at a low jet flow speed. Furthermore, the result of Example 3 shows that even if the jet flow speed of the rectilinear flow A is low and highly concentrated aqueous solution of haloid salt and aqueous solution of silver nitrate are used, it is possible to form sufficiently small silver halide emulsion particles by adopting a parallel-shaped thin-film jet flow or fan-shaped thin-film jet flow for the rectilinear flow A.

Third Embodiment

The third embodiment is configured in such a way that the other liquid is blown out from the second nozzle as a crossflow that crosses the rectilinear flow at a substantially right angle at an intermediate point of the first nozzle that blows out the rectilinear flow and merged with the rectilinear flow, and then the rectilinear flow entrained by the crossflow is blown out into a mixing chamber of a larger diameter than that of the first nozzle.

Figure 10:
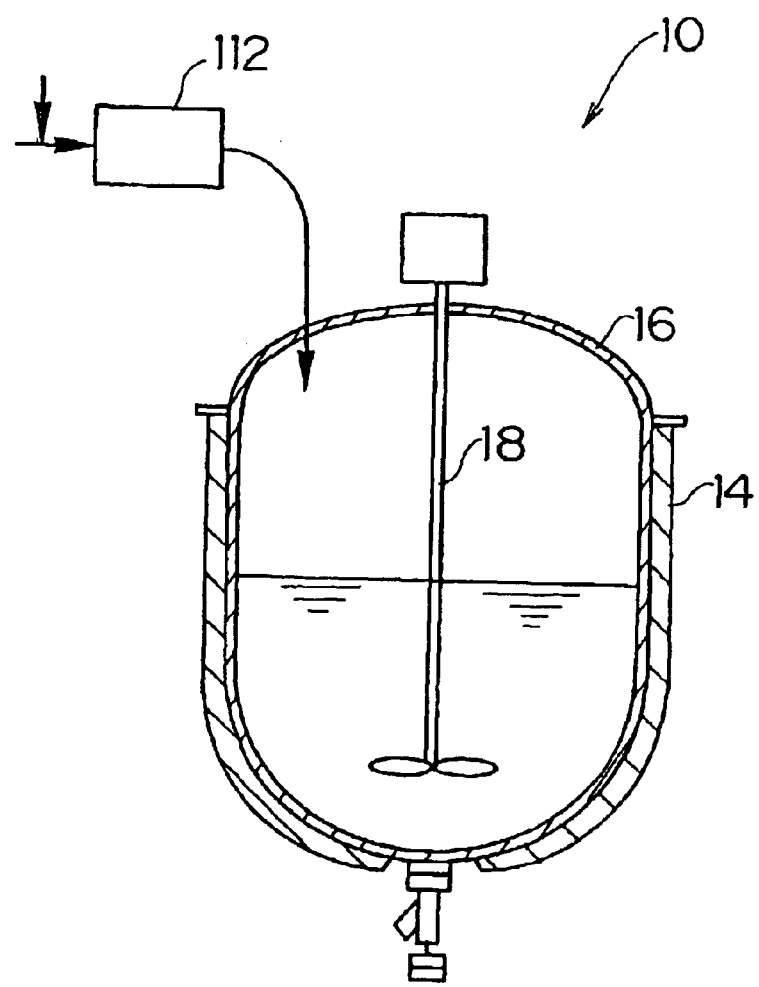
FIG. 10 is a conceptual diagram of a manufacturing line of a silver halide photosensitive material provided with a silver halide emulsion particle formation apparatus according to the third embodiment of the present invention.

FIG. 10 is a conceptual diagram of a manufacturing line 10 of a silver halide photosensitive material provided with a silver halide emulsion particle formation apparatus according to the third embodiment of the present invention.

The manufacturing line 10 of a silver halide photosensitive material is constructed of a nucleus formation step of forming fine particle nuclei of silver halide emulsion particles and a nucleus growth step of contacting the fine particle nuclei formed in the nucleus formation step with silver halide emulsion particles for growth and letting fine particle nuclei grow. Then, a static mixing apparatus 112 which is a silver halide emulsion particle formation apparatus of the present invention is set in the nucleus formation step and a growth tank 16 provided with a heating jacket 14 is set in the nucleus growth step.

In the static mixing apparatus 112, an aqueous solution of silver nitrate X and aqueous solution of haloid salt Y are allowed to mix and react with each other instantaneously, a liquid resulting from the mixing and reaction Z including fine particle nuclei of silver halide emulsion particles is formed and sent to the growth tank 16 immediately. The fine particle nuclei sent to the nucleus growth tank 16 grow through Ostwald maturation while being stirred by a stirrer 18 in the solution of silver halide emulsion particles for growth. It is also desirable to use the same static mixing apparatus as that used in the nucleus formation step for the formation of silver halide emulsion particles for growth in this nucleus growth step.

Figure 11:
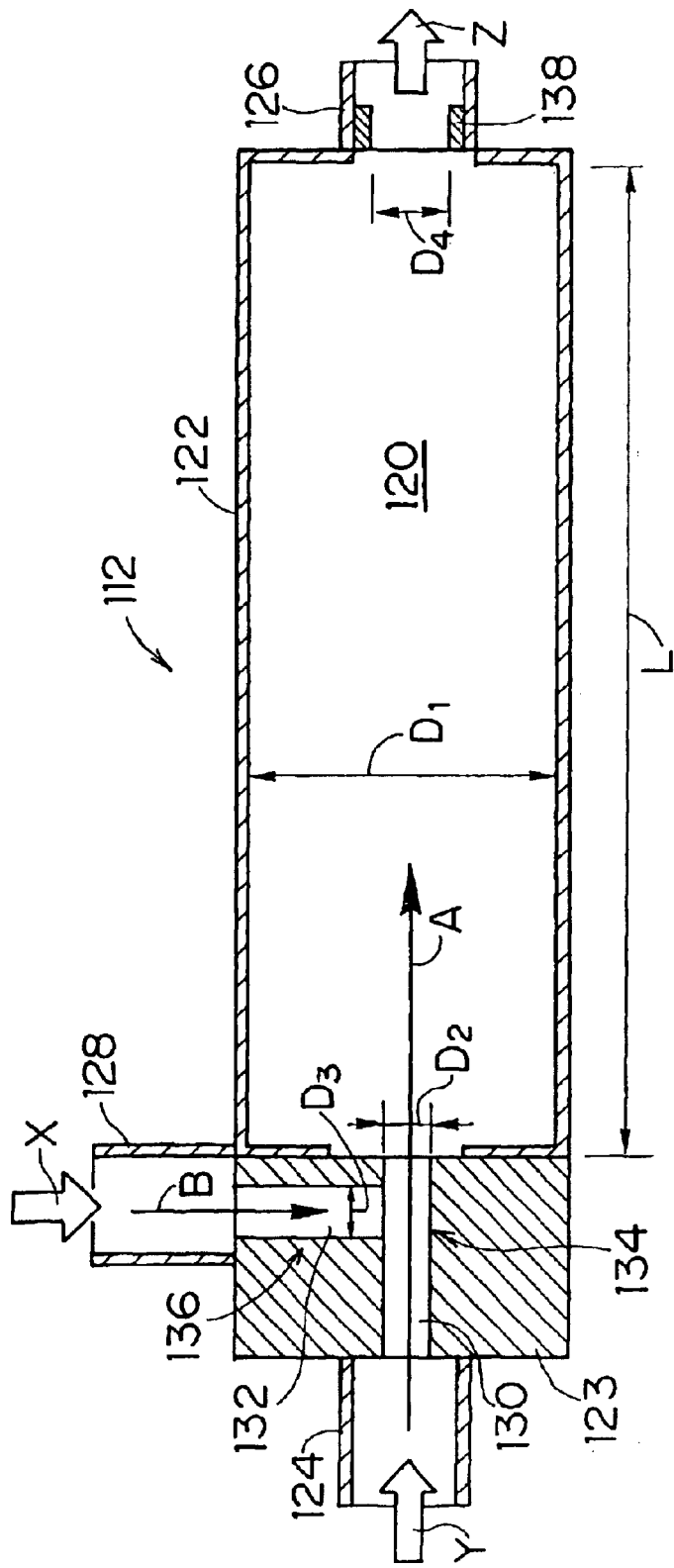
FIG. 11 is a conceptual diagram of the static mixing apparatus at the silver halide emulsion particle formation apparatus according to the third embodiment of the present invention.

FIG. 11 is a conceptual diagram showing the structure of the static mixing apparatus 112 according to present invention.

As shown in FIG. 11, the static mixing apparatus 112 is constructed of a first nozzle 134 that blows out an aqueous solution of haloid salt Y as a rectilinear flow A of turbulent flow, a second nozzle 136 that blows out an aqueous solution of silver nitrate X as a crossflow B that crosses the rectilinear flow A at a substantially right angle at an intermediate point of the first nozzle 134 to merge it with the a rectilinear flow A, a mixer 122 provide with a mixing chamber 120 that blows out the rectilinear flow A entrained by the crossflow B to allow the aqueous solution of silver nitrate X and aqueous solution of haloid salt Y to mix and react with each other and a discharge duct 126 that discharges the liquid resulting from the mixing and reaction from the mixing chamber 120. The first nozzle 134 is designed to blow out the aqueous solution of haloid salt Y and the second nozzle 136 is designed to blow out the aqueous solution of silver nitrate X, but the two liquids may also be switched round. Furthermore, the discharge duct 126 may also be connected to the side of the mixer 122 if it is at least close to the other end of the mixer 122.

The first and second nozzles 134 and 136 are formed by perforating a first orifice 130 for the rectilinear flow A integral with a second orifice 132 for the crossflow B in a block-shaped orifice material 123 connected to an opening at one end of the mixer 122. Then, a first conduit 124 that introduces the aqueous solution of haloid salt Y into the first orifice 130 is connected to the orifice material 123 and a second conduit 128 that introduces the aqueous solution of silver nitrate X into the second orifice 132 is connected to the orifice material 123.

Figure 13:
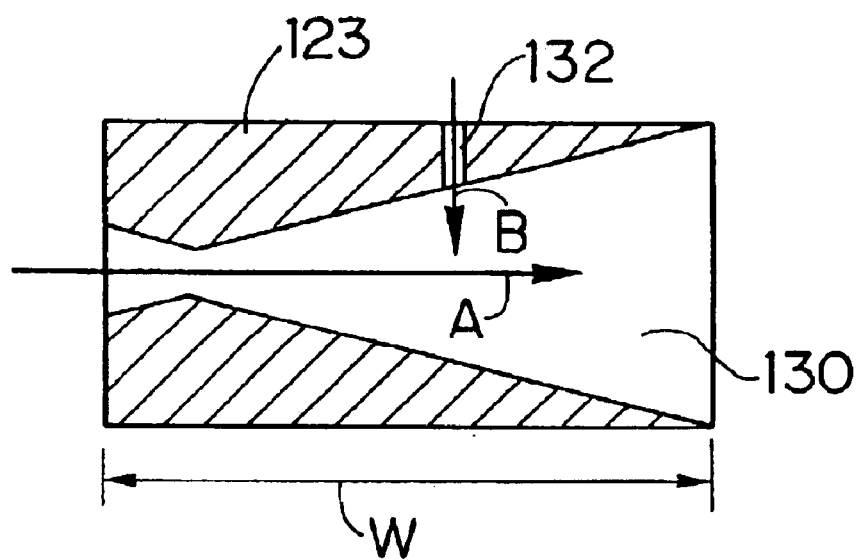
FIG. 13 is a sectional view illustrating a first orifice.

In this case, the method for perforating the first and second orifices 130 and 132 in the block-shaped orifice material 123, the material of the orifice material 123 and pressurizing section provided for the first conduit 124 and second conduit 128 are the same as those in the first embodiment. With regard to the first orifice 130, the orifice diameter may be the same throughout the total length of the orifice length W (see FIG. 13), but with regard to the structure for connecting the first nozzle 134 with the second nozzle 136, the orifice length W of the first orifice 130 making up the first nozzle 134 needs to be set as long as, for example, approximately 5 mm. Thus, to reduce pressure loss resistance of the first orifice 130, it is preferable to increase the orifice diameter of the first orifice 130 toward the outlet of the orifice. In this way, not only reducing pressure loss resistance but also connecting the second orifice 132 at the position where the diameter is extended facilitates the perforation process, too.

Then, the aqueous solution of silver nitrate X is blown out into the mixing chamber 120 from the second nozzle 136 as the crossflow B that crosses the rectilinear flow A at a substantially right angle at an intermediate point of the first nozzle 134 from which the aqueous solution of haloid salt Y is blown out as the rectilinear flow A of turbulent flow, and merged with the rectilinear flow A, and then the rectilinear flow A entrained by the crossflow B is blown out into the mixing chamber 120 of a larger diameter than that of the first nozzle 134, the aqueous solution of haloid salt Y is allowed to mix and react with aqueous solution of silver nitrate X and the liquid resulting from the mixing and reaction is discharged from the discharge duct 126 of a smaller diameter than the diameter of the mixing chamber 120.

Such mixing reaction is intended to obtain a high mixing efficiency by merging the crossflow B blown out from the direction substantially perpendicular to the rectilinear flow A with the entrained flow entrained by the high-speed rectilinear flow A of turbulent flow, blowing out the flow from the first nozzle 134 into the mixing chamber 120 and thereby taking advantage of large eddy viscosity that occurs when the rectilinear flow A of turbulent flow is mixed with the crossflow B, and the mixing chamber 120, first and second nozzles 134 and 136 and discharge duct 126 of the static mixing apparatus 112 are formed in such a way as to have the following relationship.

That is, as shown in FIG. 11, since eddy viscosity needs to be formed in the mixing chamber 120, the cylindrical diameter $D_1$ of the mixing chamber 120 is formed to be greater than the orifice diameter $D_2$ of the first nozzle 134 and the orifice diameter $D_3$ of the second nozzle 136. The diameter of the first nozzle 134 that blows out the rectilinear flow A into the mixing chamber 120 is of particular importance, the dimensional ratio of the cylindrical diameter $D_1$ of the mixing chamber 120 to the orifice diameter $D_2$ of the first nozzle 134 is preferably set within a range of 1.1 to 50 times, more preferably within a range of 1.1 to 20 times.

Figure 12:
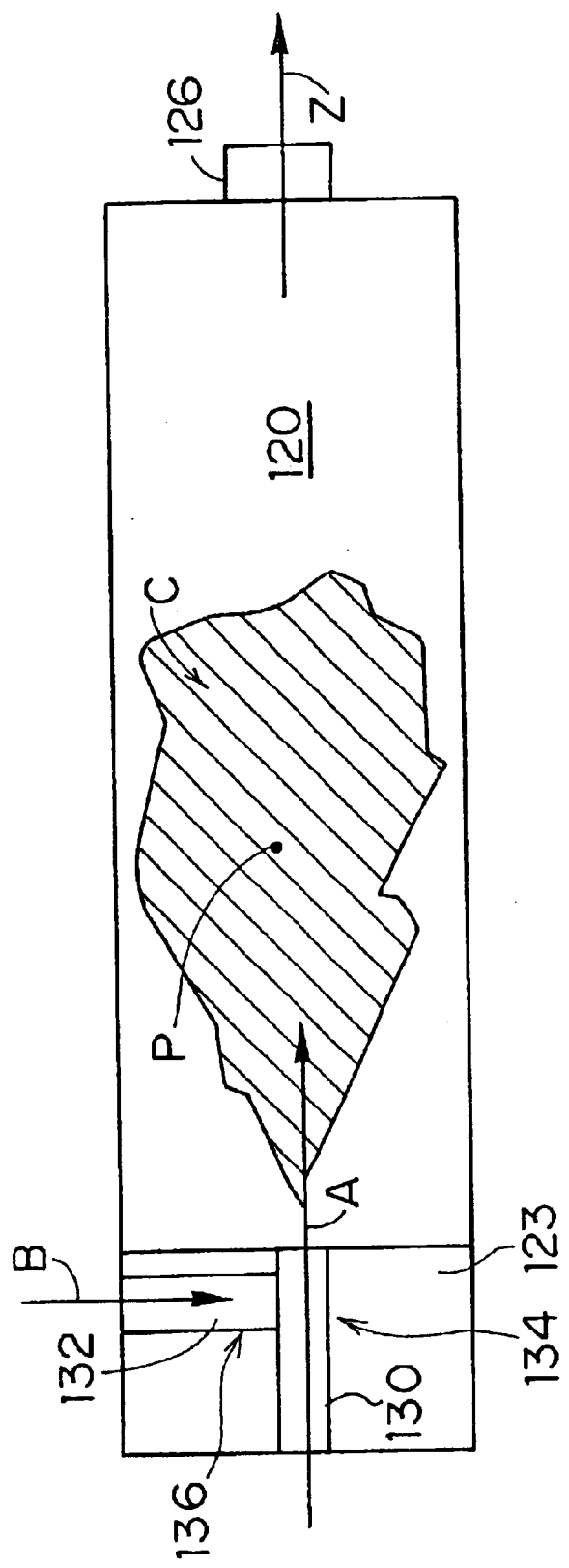
FIG. 12 is a schematic view illustrating eddy viscosity formed in a mixing chamber of the static mixing apparatus according to the third embodiment of the present invention.

Furthermore, it is necessary to secure the length L of the mixing chamber 120 necessary to form the maximum eddy viscosity C in the mixing chamber 120, but if the length L is too large, the liquid resulting from the mixing and reaction Z is likely to retain in the mixing chamber 120 or flow backward, causing an adverse effect on the miniaturization of silver halide particles and a mono-dispersion characteristic. Thus, the length L of the mixing chamber 120 is preferably 2 to 5 times the distance from the first nozzle 134 to the point P (see FIG. 12) corresponding to the maximum eddy viscosity C, more preferably 2 to 3 times.

Furthermore, when a liquid is blown out at a high flow speed from the first and second nozzles 134 and 136 of a small diameter to the mixing chamber 120 of a greater diameter, cavitation is likely to occur and this cavitation causes a gas-liquid interface to be formed in the mixing chamber 120, resulting in a reduction of the mixing efficiency. Therefore, in order to increase the mixing efficiency taking advantage of the eddy viscosity C, it is necessary to prevent the gas-liquid interface from being formed in the mixing chamber 120. Thus, as shown in FIG. 11, it is necessary to narrow the diameter $D_4$ of the discharge duct 126 using the third orifice 138 to make the diameter $D_4$ smaller than the cylindrical diameter $D_1$ of the mixing chamber 120 and mix the liquids with the pressure in the mixing chamber 120 increased. This eliminates cavitation and further improves the mixing efficiency. To minimize the residence period in a portion which does not contribute to the mixing in the discharge duct 126, it is preferable to narrow the outlet of the mixing chamber 120, minimize the length of the discharge duct 126 of a smaller inner diameter than the cylindrical diameter $D_1$ of the mixing chamber 120 and connect it to the growth tank 16.

When no mixing chamber 120 for forming the viscosity C exists or when the positional relationship between the first nozzle 134 and second nozzle 136 is not appropriate, quite a long mixing space is required so that the rectilinear flow A is taken out from the mixing site before it is mixed entrained by the crossflow B which has been added at some midpoint or completely mixed, which increases the time interval between the first mixed one and the last mixed one, increasing the particle size distribution of silver halide emulsion particles.

Furthermore, the aqueous solution of silver nitrate X is blown out from the second nozzle 136 as the crossflow B that crosses the rectilinear flow A at a substantially right angle at an intermediate point of the first nozzle 134 that blows out the aqueous solution of haloid salt Y as the rectilinear flow A of turbulent flow to merge it with the a rectilinear flow A. In this case, the crossflow B should not necessarily cross the rectilinear flow A at an angle of 90 degrees if it is at least predominantly composed of an orthogonal velocity vector component. Thus, for the mixing reaction using eddy viscosity, it is important to blow out the crossflow B to the rectilinear flow A at a position before the eddy viscosity C formed in the mixing chamber 120 reaches a maximum or a position before the maximum flow speed of the rectilinear flow A is reduced to $\frac{1}{10}$ and the position of the mixing chamber 120 where the eddy viscosity C reaches a maximum can be grasped through a simulation using the above-described "R-Flow". In this case, as is apparent from FIG. 12, the position where the eddy viscosity C reaches a maximum is not a pinpoint but has a certain area, and therefore the maximum position of the eddy viscosity C can be set to a point P which is substantially a center of eddy viscosity C. Therefore, the second nozzle 136 can be positioned before the point P or the position of the second nozzle 136 can be positioned to the side of the mixer 122, but the second nozzle 136 is connected to an intermediate point of the first nozzle 134 as the ultimate positional relationship between the first nozzle 134 and second nozzle 136. In this way, it is possible not only to satisfy the condition that the crossflow B should be blown out to the rectilinear flow A at a position before the eddy viscosity C reaches a maximum but also to blow out the crossflow B before the flow speed of the rectilinear flow A decelerates and prevent a concentration distribution of the aqueous solution of haloid salt Y or aqueous solution of silver nitrate X from occurring in the mixing chamber 120. Therefore, it is possible to further improve the performance of mixing and reaction between the aqueous solution of haloid salt Y and aqueous solution of silver nitrate X.

Furthermore, in order to make it easier for the crossflow B to merge with the rectilinear flow A and be entrained by the rectilinear flow A, it is desirable that the jet flow speed of the crossflow B be equal to or lower than the jet flow speed of the rectilinear flow A, and more specifically the ratio of the jet flow speed of the crossflow B to the jet flow speed of the rectilinear flow A is preferably 0.05 to 0.4 times, more preferably 0.1 to 0.3 times.

Furthermore, the jet flow shape of the rectilinear flow A or the crossflow B may be a string-shaped thin jet flow shape, but it is preferable to adopt a thin-film shape as the jet flow shape of the rectilinear flow A or the crossflow B and blow out the thin-film crossflow B in such a way that the crossflow B crosses the thin-film plane of the rectilinear flow A at a substantially right angle. This makes it possible to increase the area of the entraining interface created by the rectilinear flow A or the entrained interface created by the crossflow B allowing the rectilinear flow A to easily entrain the crossflow B.

Figure 14A:
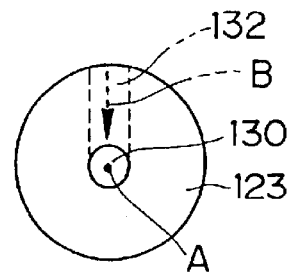
FIGS. 14(a) to 14(c) illustrate the shape of an orifice forming a string-shaped jet flow.
Figure 14B:
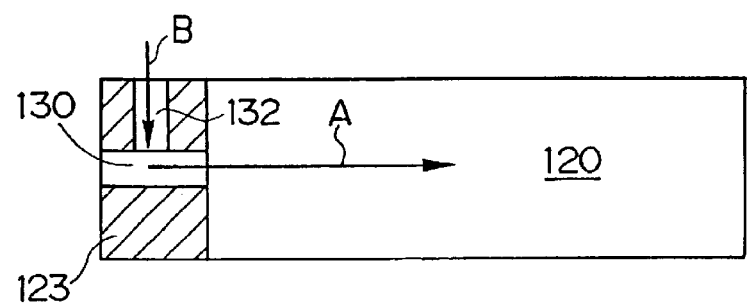
Figure 14C:
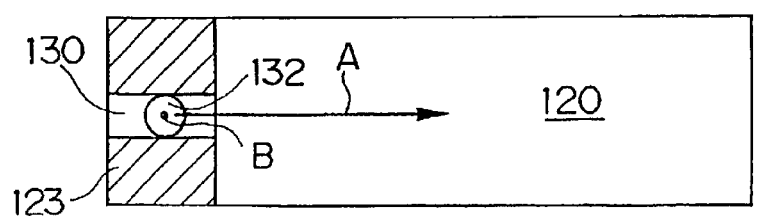

FIGS. 14(*a*) to 14(*c*) illustrate the shape of the orifice when the jet flow shape of the rectilinear flow A or crossflow B is string-shaped and the linear second orifice 132 communicates with the linear first orifice 130 at an intermediate point. On the other hand, FIGS. 15(*a*) to 15(*c*) illustrate the shape of the orifice when the jet flow shape of the rectilinear flow A or crossflow B is thin-film-shaped and the slit-shaped second orifice 132 communicates with the slit-shaped first orifice 130 at an intermediate point. Each (a) in the figures is the orifice viewed from the end of the orifice, each (b) is a longitudinal sectional view of the orifice and each (c) is a cross-sectional view of the orifice.

Figure 15A:
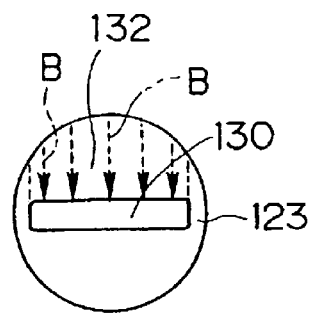
FIGS. 15(a) to 15(c) illustrate the shape of an orifice forming a parallel-shaped thin-film jet flow.
Figure 15B:
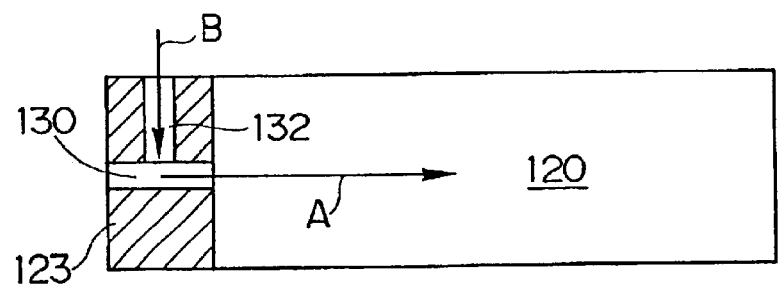
Figure 15C:
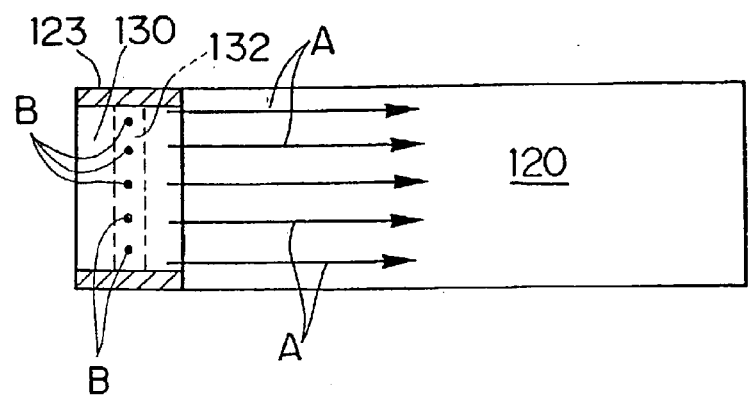

With respect to the slit-shaped orifice shown in FIGS. 15(*a*) to 15(*c*), Formula (1) is used as described in the first embodiment.

Then, the method for creating silver halide emulsion particles using the static mixing apparatus 112 in the above-described configuration will be explained.

The aqueous solution of silver nitrate X is blown out from the second nozzle 136 as the crossflow B at an intermediate point at which the aqueous solution of haloid salt Y is blown out from the first nozzle 134 as the rectilinear flow A of turbulent flow into the flow mixing chamber 120. In this way, the rectilinear flow A merges with the crossflow B in the first nozzle 134 and the rectilinear flow A is blown out from the first nozzle 134 into the mixing chamber 120 in such a way that the rectilinear flow A entrains the crossflow B, eddy viscosity C between the rectilinear flow A and the crossflow B occurs in the mixing chamber 120 and this eddy viscosity C allows the mixing and reaction to take place efficiently. The liquid resulting from the mixing and reaction Z in the mixing chamber 120 is discharged from the discharge duct 126 having a third orifice 138 of a smaller diameter than the cylindrical diameter of the mixing chamber 120.

Thus, the method of creating silver halide emulsion particles according to the present invention is configured in such a way that the rectilinear flow A is blown out from the first nozzle 134 into the mixing chamber 120 so that the rectilinear flow A entrains the crossflow B causing eddy viscosity C which overlaps the rectilinear flow A with the crossflow B in the mixing chamber 120, and therefore it is possible to improve the mixing and reaction characteristic compared to a case where the flows are allowed to collide with each other in a very narrow pipe such as a conventional T-shaped or Y-shaped pipe.

Furthermore, the aqueous solution of silver nitrate X is blown out into the mixing chamber 120 from the second nozzle 136 as the crossflow B that crosses the rectilinear flow A at a substantially right angle at an intermediate point of the first nozzle 134 from which the aqueous solution of haloid salt Y is blown out as the rectilinear flow A, and merged with the rectilinear flow A, and therefore it is possible to blow out the crossflow B before the flow speed of the rectilinear flow A decelerates and prevent a concentration distribution of the aqueous solution of haloid salt Y or aqueous solution of silver nitrate X from occurring in the mixing chamber 120. When the structure in which the second nozzle 136 is communicated at an intermediate point of the first nozzle 134 is formed in the orifice member 123, it is possible to form the structure by perforating diamond, but such processing cost can be very expensive or it is difficult to form the structure to a predetermined orifice diameter. However, the present invention can maintain favorable mixing performance compared to the case explained in the first embodiment where the rectilinear flow A and crossflow B are blown out into the mixing chamber 120 even if the flow speed of the jet from the first nozzle 134 to the mixing chamber 120 is drastically decelerated. This eliminates the need for forming a diamond orifice member 123, makes it possible to use the orifice member 123 with good workability and lower material cost such as various metals subjected to the above-described hardness treatment, metal alloy or ceramics and widen the range of selection of the orifice member 123.

Furthermore, the present invention can decelerate the jet flow speeds of the rectilinear flow A and crossflow B, and can thereby suppress heating caused by liquid-liquid friction between the rectilinear flow A and crossflow B even with the structure in which the second nozzle 136 is communicated at an intermediate point of the first nozzle 134. Thus, Ostwald maturation hardly develops.

Furthermore, by adopting a thin-film shape for the rectilinear flow A and blowing out the thin-film-shaped crossflow B in such a way as to cross the thin-film plane of the rectilinear flow A at a substantially right angle, the present invention can increase the area of the entraining interface created by the rectilinear flow A and the area of the entrained interface created by the crossflow B allowing the rectilinear flow A to entrain the crossflow B accurately.

EXAMPLE 7

Example 7 based on the third embodiment of the present invention is a test conducted using the static mixing apparatus 112 shown in FIG. 11.

That is, in the static mixing apparatus 112, an orifice member 123 is provided at one end of the mixer 122 in which the mixing chamber 120 having a cylindrical diameter of 3 mm and a length of 20 mm is formed, a first orifice 130 having a length W of 5 mm and a diameter of 0.4 mm for generating a rectilinear flow A of turbulent flow is perforated in this orifice member 123 to form a first nozzle 134 and a second orifice 132 having a diameter of 0.6 mm is perforated at a position 1.5 mm ahead of the orifice outlet of the first orifice 130 so that it communicates with the first orifice 130 to form a second nozzle 136. Furthermore, a discharge duct 126 provided with a third orifice 138 having a diameter of 1.2 mm is connected opposite to the first and second nozzles 134 and 136. Then, an aqueous solution of potassium bromide of 1.0 mol/L (containing 2% gelatin as protective colloid) was blown out from the second nozzle 136 at a flow speed of approximately 25 m/sec at an intermediate point of the first nozzle 134 through which an aqueous solution of silver nitrate X of 1.0 mol/L flows at a flow speed of approximately 60 m/sec.

Figure 16:
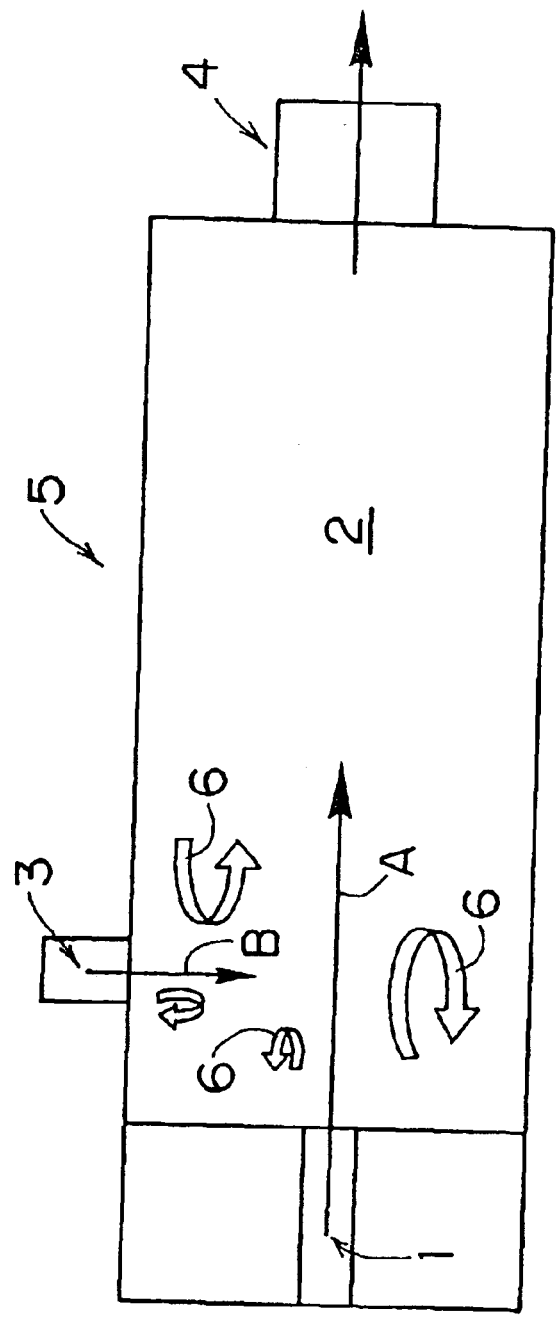
FIG. 16 is used as a comparative example illustrating a type of a static mixing apparatus that forms eddy viscosity by blowing out a rectilinear flow and crossflow into the mixing chamber.

On the other hand, a comparative example is a test conducted using a static mixing apparatus that blows out the rectilinear flow A and crossflow B shown in FIG. 16 into the mixing chamber.

In the comparative example, a first nozzle 1 with an orifice having a diameter of 0.2 mm is provided at one end of a mixer 5 in which a mixing chamber 2 having a cylindrical diameter of 3 mm and a length of 20 mm is formed, an aqueous solution of silver nitrate X of 1.0 mol/L is blown out from the first nozzle 1 into the mixing chamber 2 as a rectilinear flow A of turbulent flow at a flow speed of approximately 200 m/sec. A second nozzle 3 for blowing out an aqueous solution of haloid salt Y which is a crossflow B is provided at the position of the mixing chamber 2 which is separate 10 mm from the outlet of the first nozzle 1, an aqueous solution of potassium bromide of 1.0 mol/L (containing 2% gelatin as protective colloid) was blown out from the second nozzle 3 at a flow speed of approximately 25 m/sec. Furthermore, a discharge duct 4 having a diameter of 1.2 mm was connected opposite to the nozzle section of the mixer 5.

The silver halide emulsion particles formed using the static mixing apparatuses of the example and comparative example were frozen drastically with liquid nitrogen and their particle sizes were measured using an electron microscope.

As a result, the average particle size of the silver halide emulsion particles formed by the static mixing apparatus of the example based on the third embodiment of the present invention was 8.2 nm and showed a marked monodispersion characteristic. On the other hand, the average particle size of the silver halide emulsion particles formed by the static mixing apparatus of the comparative example was 8.6 nm and showed a mono-dispersion characteristic worse than that of the example.

Furthermore, according to the example, the temperature of the aqueous solution of silver nitrate X and aqueous solution of haloid salt Y introduced into the first nozzle 134 and the second nozzle 136 was 20° C., the liquid temperature at the discharge duct 126 was 22° C., that is, the temperature rose 2° C. In contrast, according to the comparative example, the temperature of the aqueous solution of silver nitrate X and aqueous solution of haloid salt Y supplied to the first nozzle 1 and the second nozzle 3 was 20° C., the liquid temperature at the discharge duct 4 was 26° C., that is, the temperature rose 6° C. This shows that the example can suppress heating caused by liquid-liquid friction.

Furthermore, a cause analysis was conducted on the example and comparative example using the above-described numerical analysis software R-Flow. As the analysis items, jet flow speed, jet pressure, eddy viscosity and mixing state were analyzed. As the method of this analysis, a dynamic area separation method was used to create mesh, SIMPLE was used as an analysis algorithm and k-$\epsilon$ method was used as a turbulent model.

As a result, eddy viscosity C occurred in the mixing chamber equally in both the example and comparative example, but it was confirmed that while no eddy occurred in the mixing chamber in the case of the example, eddy occurred in the comparative example.

Furthermore, in the case of the example, even if the jet flow speed from the first nozzle 134 was decelerated to a little less than $\frac{1}{3}$ of that of the comparative example, the mixing state in the mixing chamber 120 was equivalent to that of the comparative example.

Fourth Embodiment

The fourth embodiment of the present invention is configured in such a way that at least two substantially-parallel rectilinear flows of turbulent flow are blown out into a mixing chamber from one end to the other of the mixing chamber.

Figure 17:
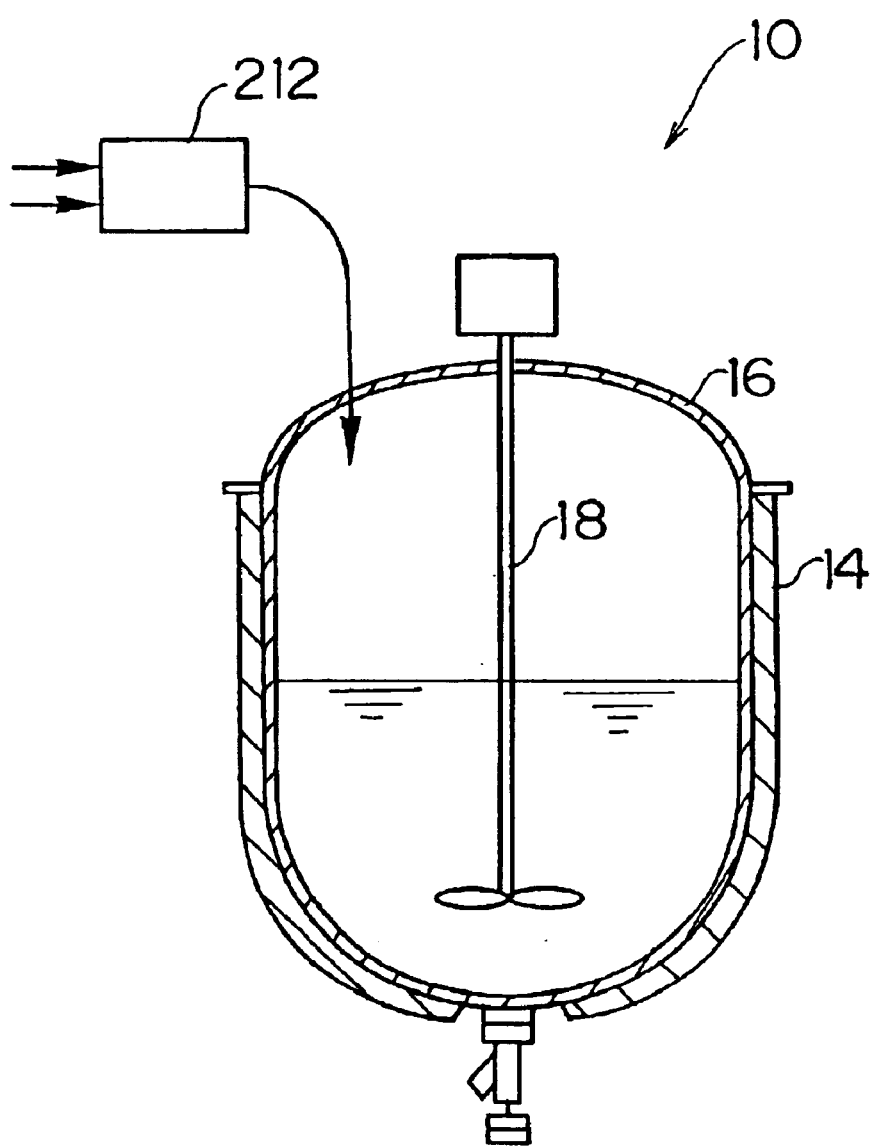
FIG. 17 is a conceptual diagram of a manufacturing line of a silver halide photosensitive material provided with a silver halide emulsion particle formation apparatus according to the fourth embodiment of the present invention.

FIG. 17 is a conceptual diagram of a manufacturing line 10 of a silver halide photosensitive material provided with a silver halide emulsion particle formation apparatus according to the present invention.

The manufacturing line 10 of a silver halide photosensitive material comprises a nucleus formation step of forming fine particle nuclei of silver halide emulsion particles and a nucleus growth step of letting fine particle nuclei grow by contacting the fine particle nuclei formed in the nucleus formation step with silver halide emulsion particles for growth. Then, the static mixing apparatus 212 which is the silver halide emulsion particle formation apparatus of the present invention is placed in the nucleus formation step and a growth tank 16 provided with a heating jacket 14 is placed in the nucleus growth step.

In the static mixing apparatus 212, an aqueous solution of silver nitrate X and aqueous solution of haloid salt Y are allowed to mix and react with each other instantaneously, a liquid resulting from the mixing and reaction Z including fine particle nuclei of silver halide emulsion particles is formed and sent to the growth tank 16 immediately. The fine particle nuclei sent to the growth tank 16 grow through Ostwald maturation while being stirred by a stirrer 18 in a solution of silver halide emulsion particles for growth. It is preferable to use the same static mixing apparatus as that used in the nucleus formation step for the formation of silver halide emulsion particle in this nucleus growth step.

Figure 18:
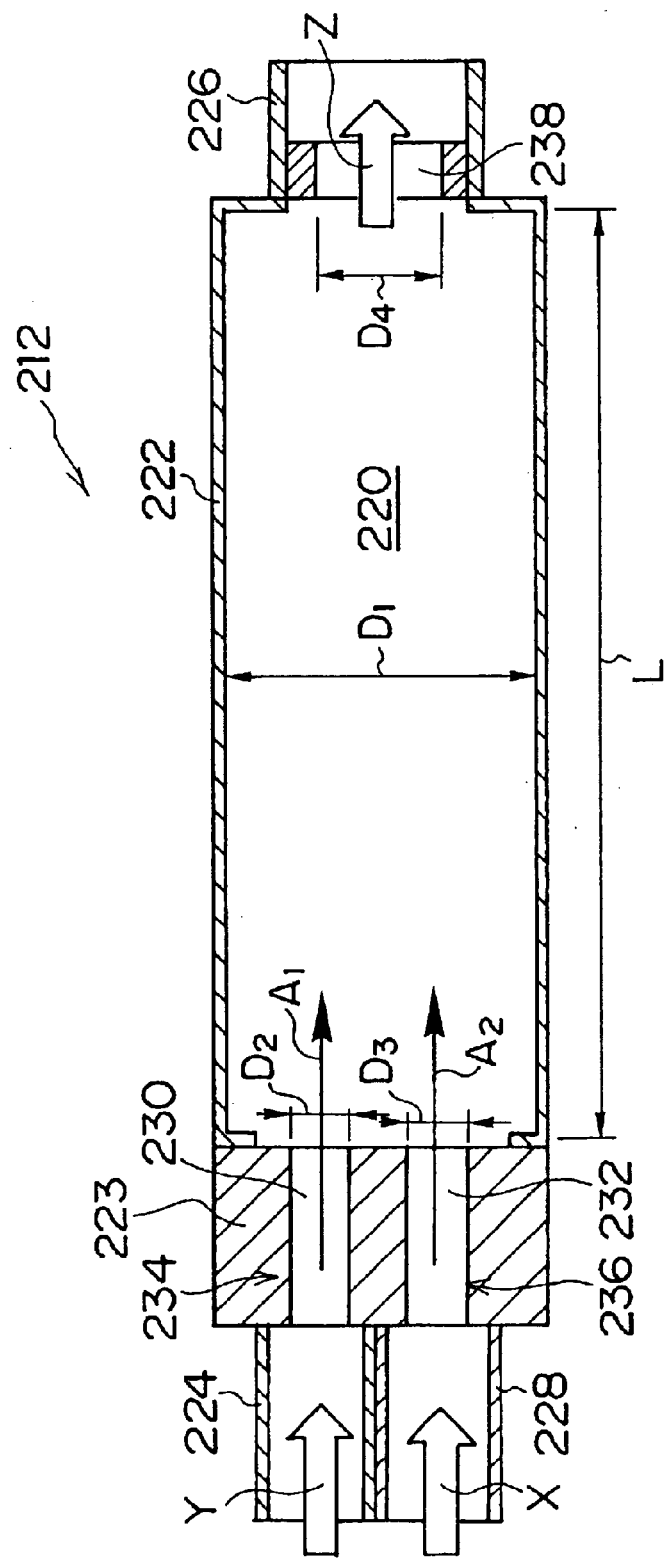
FIG. 18 is a conceptual diagram showing a cross-sectional view of the static mixing apparatus at the silver halide emulsion particle formation apparatus according to the fourth embodiment of the present invention.
Figure 19:
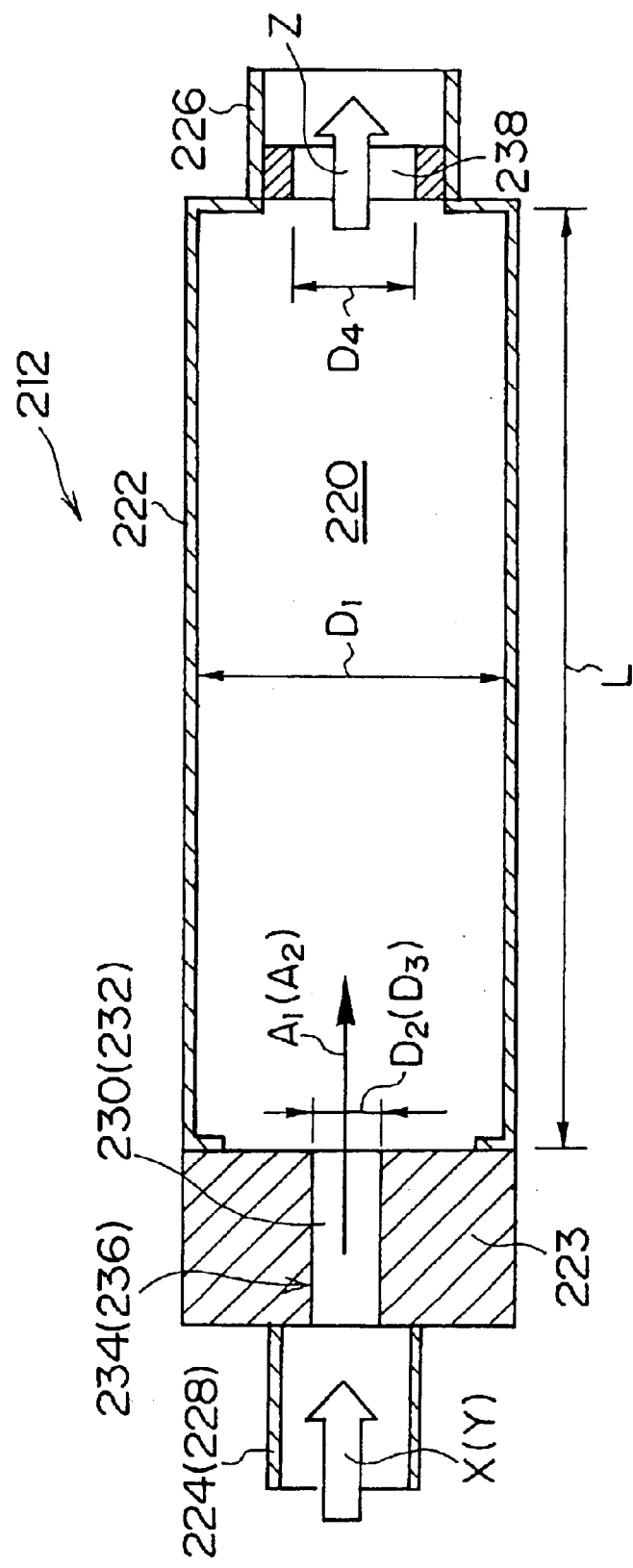
FIG. 19 is another conceptual diagram showing a longitudinal sectional view of the static mixing apparatus at the silver halide emulsion particle formation apparatus according to the fourth embodiment of the present invention.

FIG. 18 and FIG. 19 are conceptual diagrams showing the structure of the static mixing apparatus 212 of the present invention using a cross-sectional view (FIG. 18) and longitudinal sectional view (FIG. 19).

As shown in FIG. 18 and FIG. 19, in the static mixing apparatus 212, an orifice member 223 is connected to an opening at one end of a mixer 222 in which a cylindrical mixing chamber 220 to allow the aqueous solution of silver nitrate X and aqueous solution of haloid salt Y to mix and react with each other is formed and a first nozzle 234 for the aqueous solution of haloid salt Y and a second nozzle 236 for the aqueous solution of silver nitrate X are formed in the orifice member 223. Then, the aqueous solution of silver nitrate X and aqueous solution of haloid salt Y are blown out into the mixing chamber 220 from one end to the other of the mixing chamber 220 as two rectilinear flows $A_1$ and $A_2$ of turbulent flow. Furthermore, a discharge duct 226 for discharging a liquid resulting from the mixing and reaction Z in the mixing chamber 220 from the mixing chamber 220 is connected to the other end of the mixer 222. This embodiment will describe an example where the aqueous solution of haloid salt Y is blown out from the first nozzle 234 and the aqueous solution of silver nitrate Y is blown out from the second nozzle 236, but both liquids may also be switched round. Furthermore, the discharge duct 226 may also be connected to the side of the mixer 222 if it is close to the other end of the mixer 222.

The first and the second nozzle 234 and 236 are formed by perforating the first orifice 230 integral with the second orifice 232 for two rectilinear flows $A_1$ and $A_2$ in the block-shaped orifice member 223 adjacent to the mixer 222. Then, a first conduit 224 for introducing the aqueous solution of haloid salt Y into the first orifice 230 is connected to the orifice member 223 and a second conduit 228 for introducing the aqueous solution of silver nitrate X into the second orifice 232 is connected to the orifice member 223.

In this case, the method for perforating the first and second orifices 230 and 232 in the block-shaped orifice member 223, the material of the orifice member 223, the pressurizing device provided for the first conduit 224 and second conduit 228 are the same as those in the first embodiment.

Then, the aqueous solution of haloid salt Y and aqueous solution of silver nitrate X are blown out from the first nozzle 234 and the second nozzle 236 from one end to the other of the mixing chamber 220 as two rectilinear flows $A_1$ and $A_2$ of turbulent flow into the mixing chamber 220 and the aqueous solution of haloid salt and aqueous solution of silver nitrate are allowed to mix and react with each other instantaneously by overlapping two eddy viscosities C and D (see FIGS. 20 and 21) formed by these two rectilinear flows $A_1$ and $A_2$ to form the liquid resulting from the mixing and reaction Z including silver halide emulsion particles.

Such mixing and reaction provides a high mixing efficiency by overlapping the largest parts of the eddy viscosities C and D formed in the mixing chamber 220 by the two high-speed rectilinear flows A and B of turbulent flow in such a way as to maximize the overlapping area.

Therefore, the above-described mixing chamber 220, the first and second nozzles 234 and 236 and the discharge duct 226 of the static mixing apparatus 212 are formed in such a way as to have the following relationship.

That is, it is necessary to form eddy viscosity in the mixing chamber 220 and cylindrical diameter $D_1$ of the mixing chamber 220 is formed to be greater than orifice diameter $D_2$ of the first nozzle 234 and orifice diameter $D_3$ of the second nozzle 236. More specifically, the dimensional ratio of the cylindrical diameter $D_1$ of the mixing chamber 220 to the orifice diameter $D_2$ of the first nozzle 234 is preferably in a range of 1.1 to 50 times, more preferably in a range of 1.1 to 20 times. Likewise, the dimensional ratio of the cylindrical diameter $D_1$ of the mixing chamber 220 to the orifice diameter $D_3$ of the second nozzle 236 is preferably in a range of 1.1 to 50 times, more preferably in a range of 1.1 to 20 times.

Figure 20:
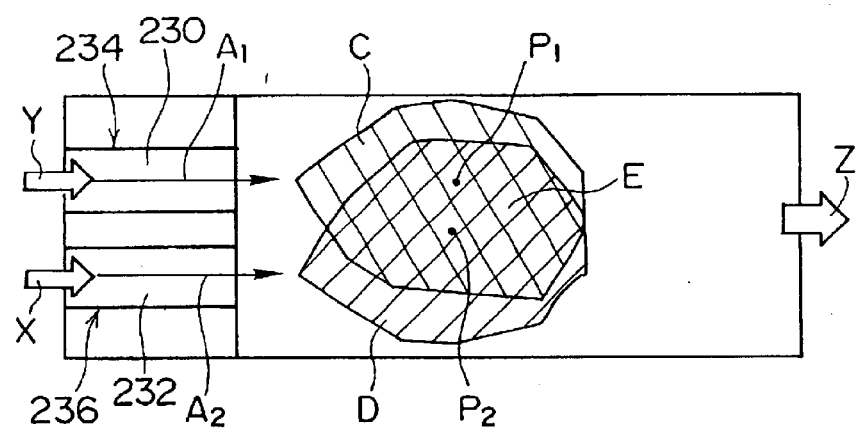
FIG. 20 is a schematic view illustrating eddy viscosity formed in the mixing chamber when the first and second nozzles of the static mixing apparatus according to the fourth embodiment of the present invention are arranged in parallel.
Figure 21:
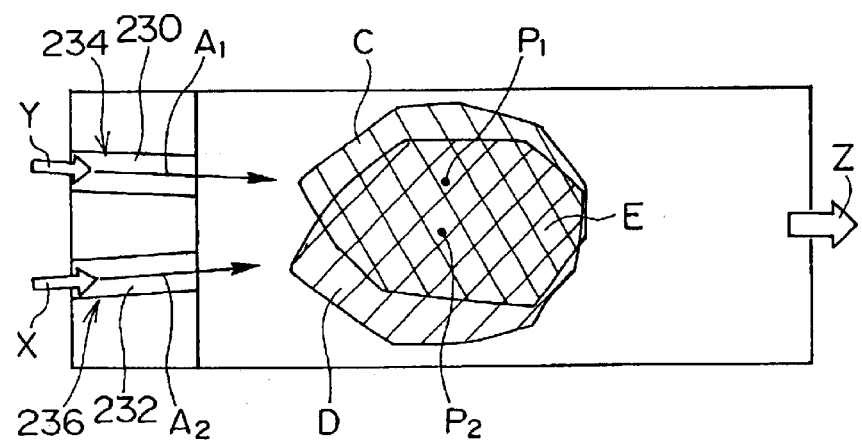
FIG. 21 is a schematic view illustrating eddy viscosity formed in the mixing chamber when the first and second nozzles of the static mixing apparatus according to the fourth embodiment of the present invention are arranged nonparallel with each other.

Furthermore, it is preferable that the rectilinear flows $A_1$ and $A_2$ do not collide with each other immediately after being blown into the mixing chamber 220 and that the area E where the two eddy viscosities C and D formed in the mixing chamber 220 by the two rectilinear flows $A_1$ and $A_2$ overlap be maximized. This requires the rectilinear flows $A_1$ and $A_2$ to be placed in substantially-parallel to each other. In this case, the first nozzle 234 need not be completely in parallel to the second nozzle 236 as shown in FIG. 20, rather as shown in FIG. 21, they are preferably arranged nonparallel with each other in that the distance between the rectilinear flows $A_1$ and $A_2$ decreases toward their ends. Arranging the nozzles in the nonparallel arrangement can secure the area E where the largest eddy viscosities C and D overlap or also completely overlap the two viscosities C and D with each other. Therefore, it is necessary to know the position where the eddy viscosities C and D reach a maximum. The position where the eddy viscosities C and D reach a maximum can be determined by carrying out a simulation beforehand as described in the first embodiment. That is, it is possible to adjust the orientations of the first nozzle 234 and the second nozzle 236 arranged nonparallel with each other so that the area where the eddy viscosities C and D overlap each other increases. In this case, as is appreciated from FIG. 20 and FIG. 21, the position where viscosities C and D reach a maximum is not a pinpoint but has a certain area, and therefore assuming that the positions where viscosities C and D reach a maximum are points $P_1$ and $P_2$, which are substantially central points of the viscosities C and D, it is possible to determine the orientations of the first nozzle 234 and the second nozzle 236 arranged nonparallel with each other so that the points $P_1$ and $P_2$ come closer to each other. Furthermore, another method for determining the points $P_1$ and $P_2$ is as follows: According to the analysis by the above-described numerical analysis software, the points $P_1$ and $P_2$ where the eddy viscosities C and D due to rectilinear flows $A_1$ and $A_2$ reach a maximum are related to the flow speeds of the rectilinear flows $A_1$ and $A_2$ and substantially correspond to the positions where the maximum flow speeds of the rectilinear flows $A_1$ and $A_2$ (normally the flow speed at the first or second nozzle position) are reduced to ⅓. Therefore, it is normally possible to calculate the positions where the maximum flow speeds of the rectilinear flows $A_1$ and $A_2$ are reduced to ⅓ and determine the points $P_1$ and $P_2$. Thus, overlapping the eddy viscosities C and D at positions where eddy viscosities C and D reach a maximum has not only the effect of increasing the contact efficiency at the liquid-liquid interface and improving the mixing/reaction performance but also the effect of suppressing heating caused by liquid-liquid friction produced by collision between the rectilinear flow $A_1$ and rectilinear flow $A_2$.

Moreover, it is also necessary to secure the length L (see FIG. 18) of the mixing chamber 220 necessary to form the maximum eddy viscosities C and D in the mixing chamber 220, but if this is too long, the liquid resulting from the mixing and reaction Z is likely to remain in the mixing chamber 220 or flow backward, causing an adverse effect on the reduction in size of silver halide particles or the monodispersion characteristic. Thus, the length L of the mixing chamber 220 is preferably 2 to 5 times the distance from the first nozzle 234 and the second nozzle 236 to the points $P_1$ and $P_2$ which are the maximum positions of the eddy viscosities C and D, more preferably 2 to 3 times.

Furthermore, when liquids are blown out from the first nozzle 234 and second nozzle 236 of a small diameter into the mixing chamber 220 of a larger diameter, it is likely to cause cavitation and this cavitation forms a gas-liquid interface and reduces a mixing efficiency. Thus, in order to increase the mixing efficiency using the eddy viscosities C and D, it is necessary to prevent any gas-liquid interface from being formed in the mixing chamber 220. Therefore, as shown in FIG. 18, it is necessary to narrow the diameter $D_4$ of the discharge duct 226 by the third orifice 238 so that $D_4$ is smaller than the cylindrical diameter $D_1$ of the mixing chamber 220 and mix the liquids with the pressure of the mixing chamber 220 increased. This can eliminate cavitation, and can thereby further improve the mixing efficiency. To minimize the residence period in the portion in the discharge duct 226 that does not contribute to the mixing in the mixing chamber 220, it is preferable to narrow the outlet in the mixing chamber 220, minimize the length of the discharge duct 226 of a smaller inner diameter than the cylindrical diameter $D_1$ of at least the mixing chamber 220 and connect it to the growth tank 16.

When no mixing chamber 220 for forming the eddy viscosities C and D exists, complete mixing of flows requires a very long mixing place, which increases the distance between the first mixed one and the last mixed one and increases the particle size distribution of silver halide emulsion particles.

Furthermore, the shape of the jet flow output from the first nozzle 234 and second nozzle 236 into the mixing chamber 220 is regulated by the first and second orifices 230 and 232 and this shape of the jet flow affects the mixing performance. Therefore, it is preferable to use the orifice for forming various shapes of the jet flow such as string-shaped jet flow, cone-shaped jet flow, parallel-shaped thin-film jet flow or fan-shaped thin-film jet flow as appropriate according to the purpose of mixing and reaction. For example, in the case of a very high reaction speed on the order of milliseconds, it is necessary to blow out the two rectilinear flows $A_1$ and $A_2$ and crossflow B so that the eddy viscosities C and D reach a maximum within the narrowest possible range instantaneously and the orifice that forms a string-shaped jet flow is preferable. On the other hand, when the reaction speed is relatively low, it is preferable to blow out the rectilinear flows $A_1$ and $A_2$ so that the eddy viscosities C and D reach a maximum within the widest possible range, thereby increasing the area of liquid-liquid interface created by the rectilinear flows $A_1$ and $A_2$, and in this case, the orifice that forms a thin-film jet flow is preferable. Furthermore, in the case of a reaction speed intermediate between the very high reaction speed on the order of milliseconds and relatively low reaction speed, the orifice that forms a cone-shaped jet flow is preferable.

FIGS. 22(a) to 22(c), 23(a) to 23(c), 24(a) to 24(c), and 25(a) to 25(c) illustrate orifices to form string-shaped jet flow, cone-shaped jet flow, parallel-shaped thin-film jet flow and fan-shaped thin-film jet flow, respectively, and each (a) in the figures shows the orifice seen from an end of the orifice, each (b) is a longitudinal sectional view of the orifice and each (c) is a cross-sectional view of the orifice.

Figure 22A:
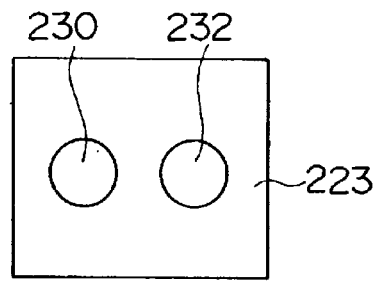
FIGS. 22(a) to 22(c) illustrate the shape of an orifice forming a string-shaped jet flow.
Figure 22B:
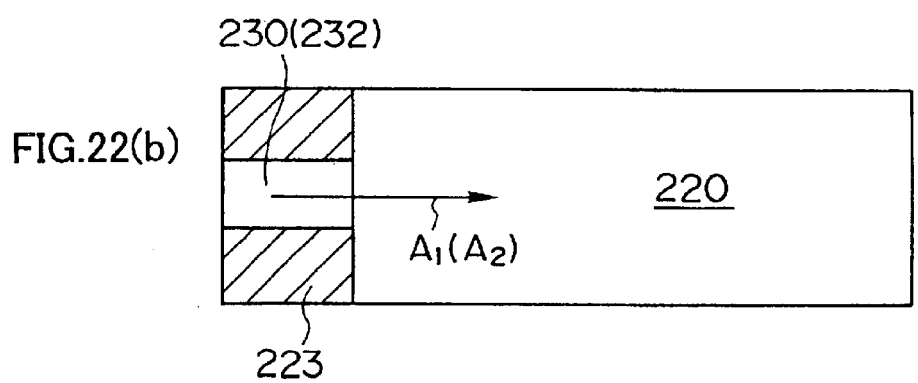
Figure 22C:
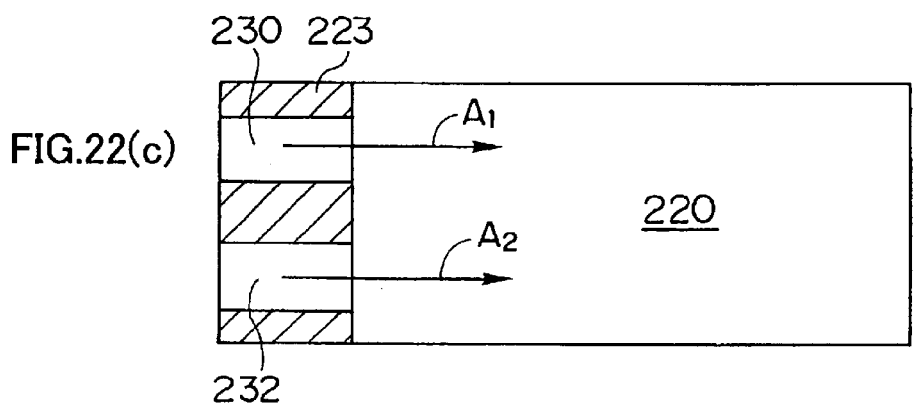
Figure 23A:
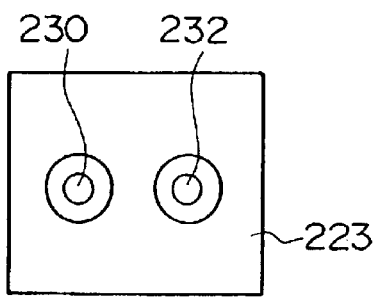
FIGS. 23(a) to 23(c) illustrate the shape of an orifice forming a cone-shaped jet flow.
Figure 23B:
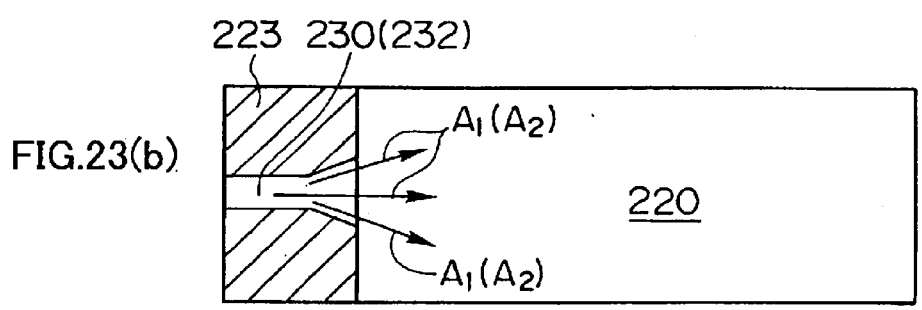
Figure 23C:
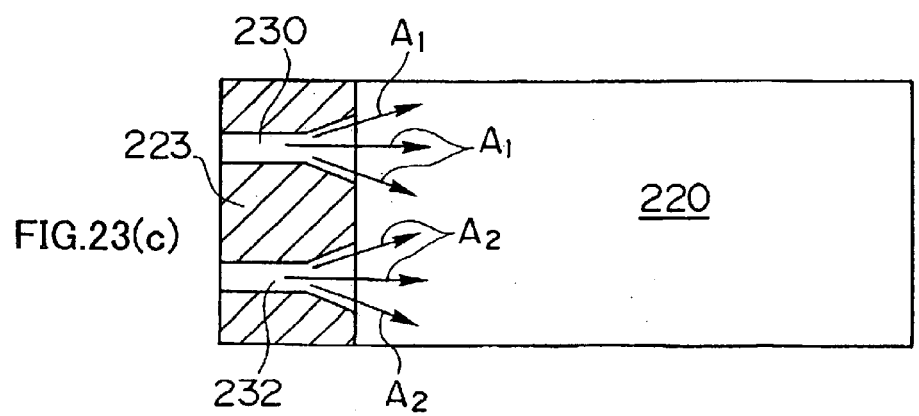
Figure 24A:
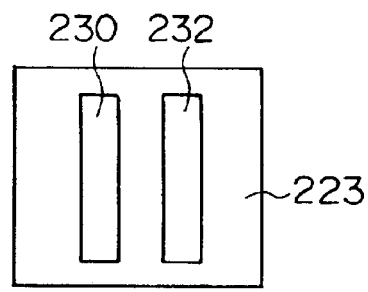
FIGS. 24(a) to 24(c) illustrate the shape of an orifice forming a parallel-shaped thin-film jet flow.
Figure 24B:
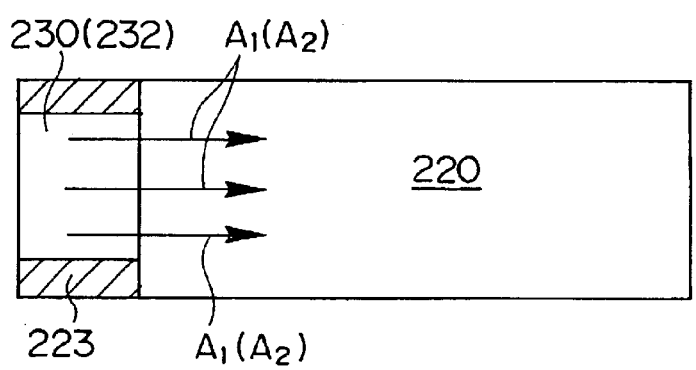
Figure 24C:
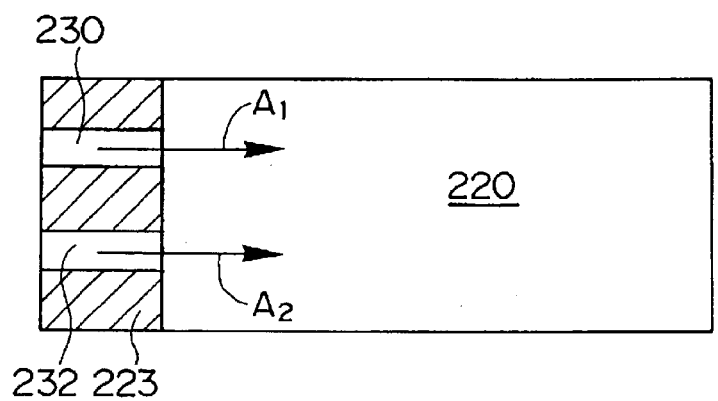
Figure 25A:
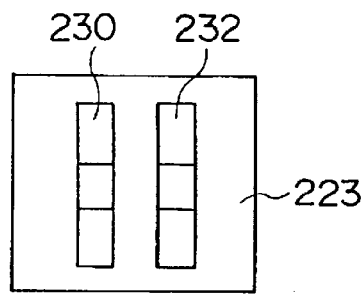
FIGS. 25(a) to 25(c) illustrate the shape of an orifice forming a fan-shaped thin-film jet flow.
Figure 25B:
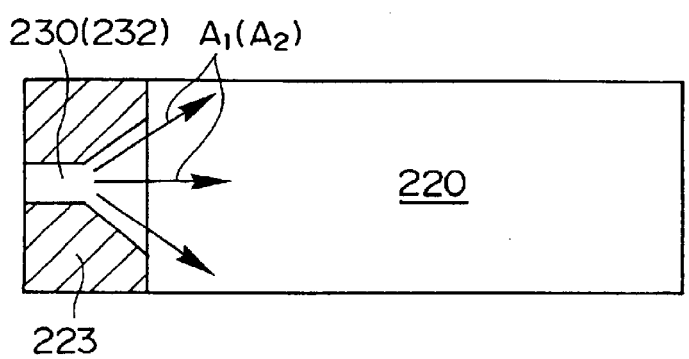
Figure 25C:
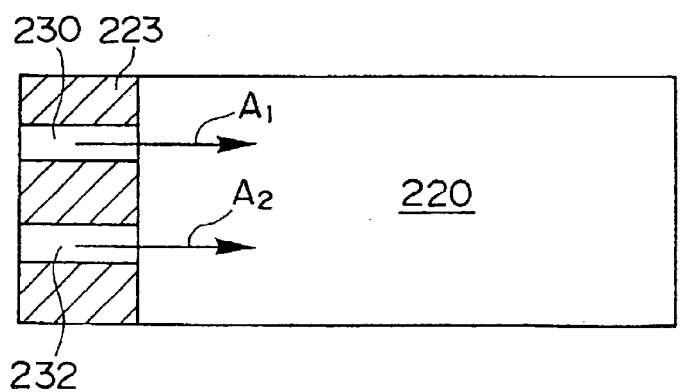

FIGS. 22(a) to 22(c) show the orifices to blow out two straight string-shaped rectilinear flows $A_1$ and $A_2$ into the mixing chamber 220 and two string-shaped and thin, first and second orifices 230 and 232 are formed in the orifice member 223. FIGS. 23(a) to 23(c) show orifices to blow out two cone-shaped rectilinear flows $A_1$ and $A_2$ into the mixing chamber 220 and two funnel-shaped, first and second orifices 230 and 232 having an open end are formed in the orifice member 223. FIGS. 24(a) to 24(c) show orifices to blow out two thin-film substantially-parallel rectilinear flows $A_1$ and $A_2$ into the mixing chamber 220 and two rectangular slit-shaped, first and second orifices 230 and 232 are formed in the orifice member 223. In this case, as shown in FIGS. 24(a) to 24(c), forming the first and second orifice 230 and 232 so that thin-film planes of the rectilinear flows $A_1$ and $A_2$ face each other is more preferable because this will increase the area of a liquid-liquid interface. FIGS. 25(a) to 25(c) show orifices to blow out two fan-shaped thin-film and substantially-parallel rectilinear flows $A_1$ and $A_2$ into the mixing chamber 220, and first and second orifices 230 and 232 with their ends expanded in a fan shape are formed in the orifice material 223.

With respect to the slit-shaped first orifice 230 shown in FIGS. 24(a) to 24(c), Formula (1) is used as described in the first embodiment.

Then, a method for forming silver halide emulsion particles using the static mixing apparatus 212 in the above-described configuration will be explained.

The aqueous solution of haloid salt Y and the aqueous solution of silver nitrate X are blown out from the first nozzle 234 and the second nozzle 236 as the substantially-parallel rectilinear flows $A_1$ and $A_2$ of turbulent flow into the mixing chamber 220 of a cylindrical diameter $D_1$ greater than the orifice diameters $D_2$ and $D_3$. In this way, by overlapping eddy viscosity C caused by rectilinear flow $A_1$ and eddy viscosity D caused by rectilinear flow $A_2$ in such a way that the area E where the eddy viscosities C and D overlap reaches a maximum, the two solutions are allowed to mix and react with each other instantaneously and the liquid resulting from the mixing and reaction Z is discharged from the discharge duct 226.

For the mixing and reaction using such eddy viscosities C and D, there are two methods for improving the mixing and reaction characteristic in the mixing chamber 220.

The first method is the one that the rectilinear flows $A_1$ and $A_2$ are blown out as string-shaped high-speed flows so that the eddy viscosities C and D reach a maximum instantaneously within the narrowest possible range. For this purpose, it is preferable to use the first and second orifices 230 and 232 that form the string-shaped jet flow in FIGS. 22(a) to 22(c) as the first and second orifices 230 and 232 of the first and second nozzles 234 and 236.

From the standpoint of mixing, the rectilinear flows $A_1$ and $A_2$ are preferably high-speed flows, but to control this reaction product to a desired particle size and size distribution, it is necessary to consider the influence of the frictional heat of liquid-liquid friction generated by the high-speed flows on the reaction. As such a measure, it is effective to decrease the temperature of the reaction liquid beforehand, adopt a double structure for the added ducts, orifice section, mixing chamber section and discharge section to cool these sections or carry out both. Furthermore, since the high-speed flow is determined by a jet pressure added in accordance with the flow speed of the jet and the inner diameters of the first and second orifices 230 and 232, creating faster flows requires the inner diameter of the first and second orifices 230 and 232 to be minimized and the pressure on the liquid to be increased. Therefore, the faster the flows, the more problematic the abrasion of the first and second orifices 230 and 232 becomes, but this can be handled by using diamond with excellent durability, etc.

The second method is the one that the rectilinear flows $A_1$ and $A_2$ are formed in a thin-film jet flow shape to increase the area of the liquid-liquid interface created by the rectilinear flows $A_1$ and $A_2$. For this purpose, it is preferable to use the first and second orifices 230 and 232 that form the parallel-shaped thin-film jet flow or fan-shaped thin-film jet flow shown in FIGS. 24(a) to 24(c) and FIGS. 25(a) to 25(c) as the first and second orifices 230 and 232 of the first and second nozzles 234 and 236 that blow out the rectilinear flows $A_1$ and $A_2$. Since this second method can secure a larger eddy viscosity area, it is possible to obtain favorable mixing performance even if the jet flow speeds of the rectilinear flows $A_1$ and $A_2$ are smaller than those of string-shaped flows. This improves the durability characteristic of the first and second orifices 230 and 232, which allows the orifice to be created with metal with good workability, metal processed product, ceramics, etc., and reducing the flow speeds of the rectilinear flows $A_1$ and $A_2$ suppresses generation of frictional heat, which allows finer silver halide emulsion particles to be formed.

EXAMPLE 8

Example 8 is a test conducted using the static mixing apparatus 212 shown in FIGS. 18 and 19.

That is, in the static mixing apparatus 212, an orifice member 223 is provided at one end of the mixer 222 in which the mixing chamber 220 having a cylindrical diameter of 3 mm and a length of 20 mm is formed, first and second orifices 230 and 232 for blowing out two rectilinear flows $A_1$ and $A_2$ of turbulent flow were perforated in this orifice member 223 to form a first nozzle 234 and second nozzle 236. The diameters of both the first and second nozzles 234 and 236 were set to 0.4 mm, an aqueous solution of silver nitrate X of 1.5 mol/L was blown out from the first nozzle 234 at a jet flow speed of approximately 58 m/sec and an aqueous solution of potassium bromide of 1.5 mol/L (containing 2% gelatin as protective colloid) was blown out at a jet flow speed of approximately 58 m/sec. Furthermore, a discharge duct 226 with a discharge port having a diameter of 1.2 mm was connected opposite to the nozzle section of the mixer 222.

On the other hand, the comparative example is a test conducted using the static mixing apparatus 5 that blows out the rectilinear flow A and crossflow B shown in FIG. 16 into the mixing chamber 2 and the test was conducted under the same conditions as those explained in FIG. 16.

The silver halide emulsion particles formed using the static mixing apparatuses of the embodiment and comparative example were frozen drastically with liquid nitrogen and their particle sizes were measured using an electron microscope.

As a result, the average particle size of the silver halide emulsion particles formed by the static mixing apparatus 212 of the example was 8.6 nm and showed a marked mono-dispersion characteristic. On the other hand, the average particle size of the silver halide emulsion particles formed by the static mixing apparatus 5 of the comparative example was 9.2 nm and showed a relatively worse mono-dispersion characteristic than that of the example.

Furthermore, in the example, the temperatures of the aqueous solution of silver nitrate X and aqueous solution of haloid salt Y introduced into the first nozzle 234 and the second nozzle 236 were 20° C., the temperature at the discharge duct 226 was 21.5° C., which meant a rise of 1.5° C. In contrast, according to the comparative example, the temperatures of the aqueous solution of silver nitrate X and aqueous solution of haloid salt Y supplied to the first nozzle 1 and the second nozzle 3 were 20° C., the liquid temperature at the discharge duct 4 was 26° C. that is, the temperature rose 6° C. This shows that the example can suppress heating caused by liquid-liquid friction better.

Furthermore, a cause analysis was conducted on the example and comparative example using the above-described numerical analysis software R-Flow. As the analysis items, jet flow speed, jet pressure, eddy viscosity and mixing state were analyzed. As the method of this analysis, a dynamic area separation method was used to create mesh, SIMPLE was used as an analysis algorithm and k-ε method was used as a turbulent flow model.

As a result, in the case of the example, the mixing state in the mixing chamber 220 was better than that of the comparative example even if the flow speeds of the jets from the first nozzle 234 and the second nozzle 236 were reduced to approximately a little less than ⅓ of those of the comparative example.

Fifth Embodiment

The fifth embodiment of the present invention is configured in such a way that at least two facing rectilinear flows of turbulent flow are blown out into a mixing chamber from one end to the other of the mixing chamber.

Figure 26:
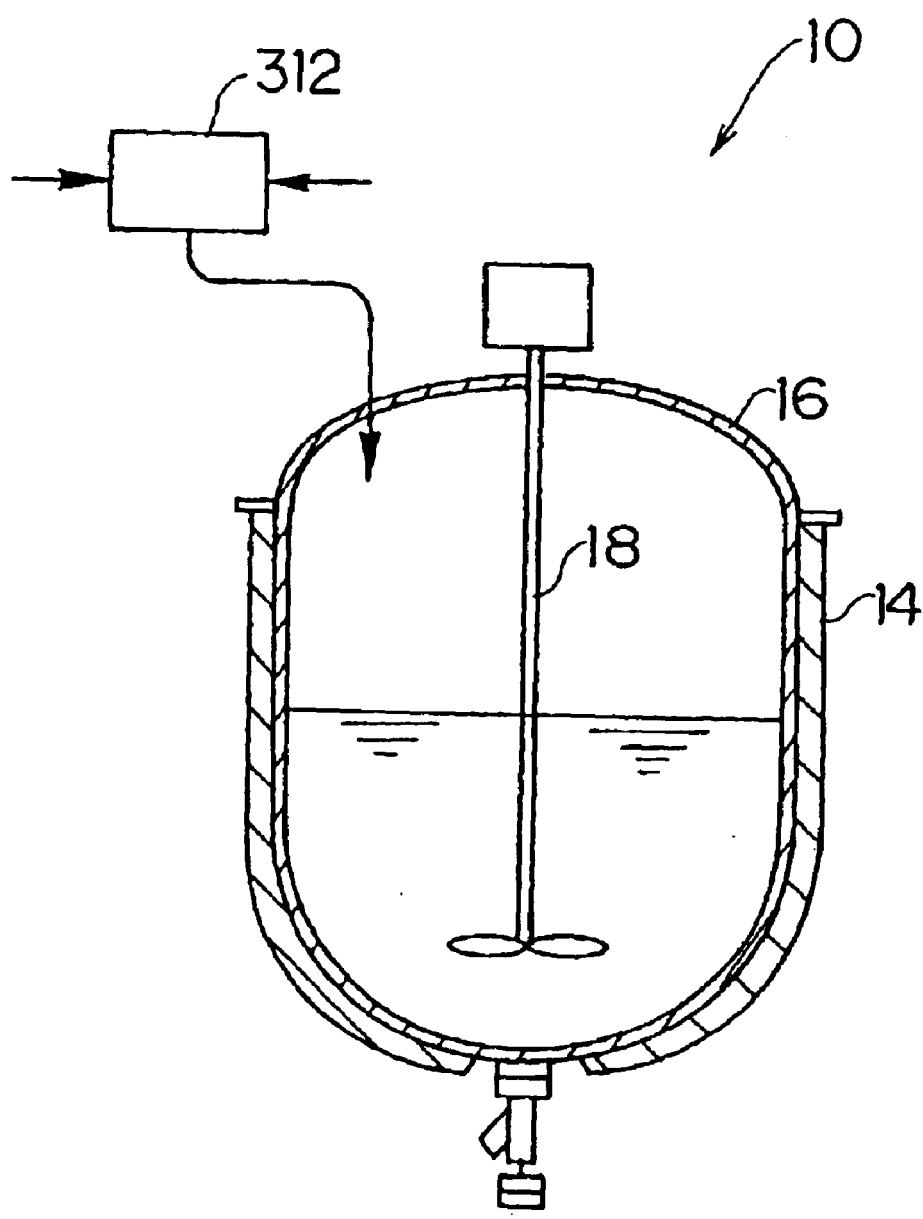
FIG. 26 is a conceptual diagram of a manufacturing line of a silver halide photosensitive material provided with a silver halide emulsion particles formation apparatus according to the fifth embodiment of the present invention.

FIG. 26 is a conceptual diagram of a manufacturing line 10 of a silver halide photosensitive material provided with a silver halide emulsion particle formation apparatus according to the present invention.

The manufacturing line 10 of a silver halide photosensitive material comprises a nucleus formation step of forming fine particle nuclei of silver halide emulsion particles and a nucleus growth step of letting fine particle nuclei grow by contacting the fine particle nuclei formed in the nucleus formation step with silver halide emulsion particles for growth. Then, the static mixing apparatus 312 which is the silver halide emulsion particle formation apparatus of the present invention is placed in the nucleus formation step and a growth tank 16 provided with a heating jacket 14 is placed in the nucleus growth step.

In the static mixing apparatus 312, an aqueous solution of silver nitrate X and aqueous solution of haloid salt Y are allowed to mix and react with each other instantaneously, a liquid resulting from the mixing and reaction Z including fine particle nuclei of silver halide emulsion particles is formed and sent to the growth tank 16 immediately. The fine particle nuclei sent to the growth tank 16 grow through Ostwald maturation while being stirred by a stirrer 18 in a solution of silver halide emulsion particles for growth. It is preferable to use the same static mixing apparatus as that used in the nucleus formation step for the formation of silver halide emulsion particle in this nucleus growth step.

Figure 27:
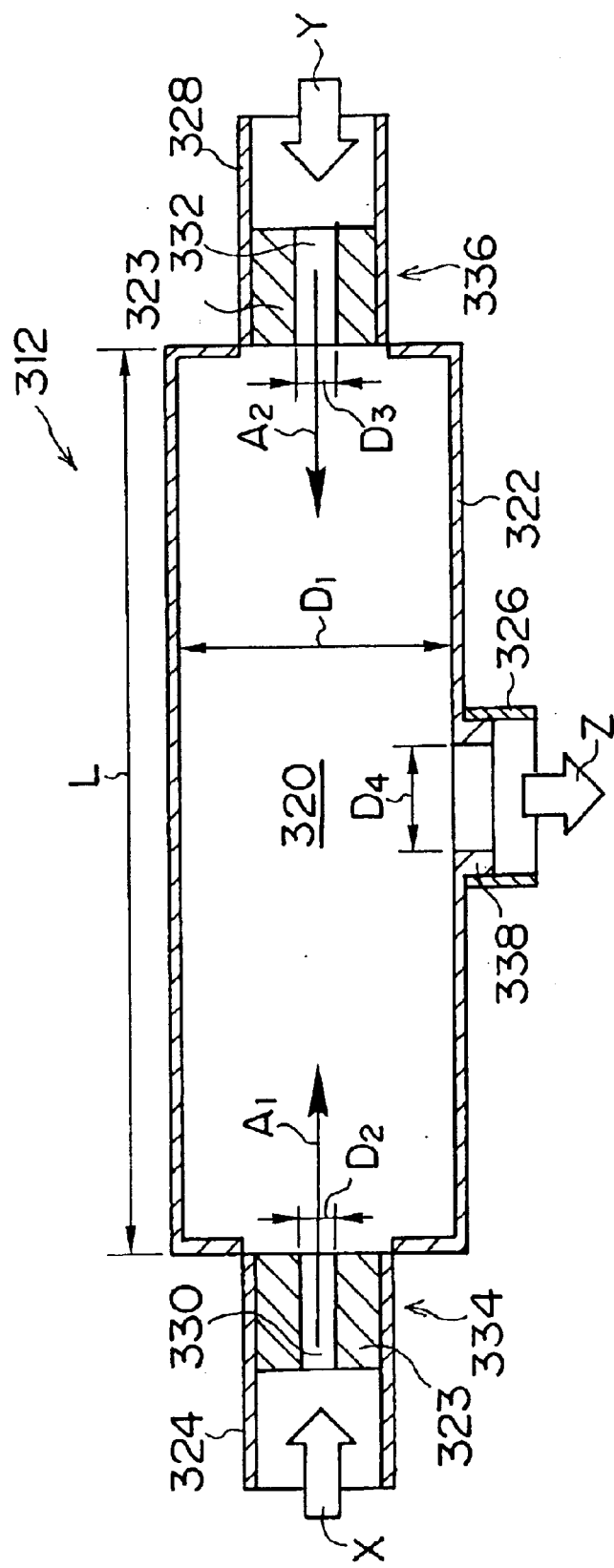
FIG. 27 is a conceptual diagram showing a cross-sectional view of the static mixing apparatus at the silver halide emulsion particle formation apparatus according to the fifth embodiment of the present invention.

FIG. 27 is a conceptual diagram showing the structure of the static mixing apparatus 312 of the present invention.

As shown in FIG. 27, in the static mixing apparatus 312, a first conduit 324 for introducing the aqueous solution of silver nitrate X into a mixing chamber 320 is connected to an opening at one end of a mixer 322 in which the cylindrical mixing chamber 320 to allow the aqueous solution of silver nitrate X and aqueous solution of haloid salt Y to mix and react with each other is formed and a second conduit 328 for introducing the aqueous solution of haloid salt Y into the mixing chamber 320 is connected to an opening at the other end. Furthermore, in an opening in the center of the mixer 322, a discharge duct 326 for discharging the liquid resulting from the mixing and reaction Z in the mixing chamber 320 from the mixing chamber 320 is connected.

At the ends of the inside of the first conduit 324 and second conduit 328, a first orifice 330 and second orifice 332 are provided, and in this way, a first nozzle 334 and second nozzle 336 for blowing out rectilinear flows $A_1$ and $A_2$ of turbulent flow are formed in the first conduit 324 and second conduit 328. This embodiment will describe an example where the aqueous solution of silver nitrate X is blown out from the first nozzle 334 and the aqueous solution of haloid salt Y is blown out from the second nozzle 336, but both liquids may also be switched round.

In this case, the method for perforating the first and second orifices 330 and 332 in the block-shaped orifice member 323, the material of the orifice member 323, the pressurizing device provided for the first conduit 324 and second conduit 328 are the same as those in the first embodiment.

Figure 28:
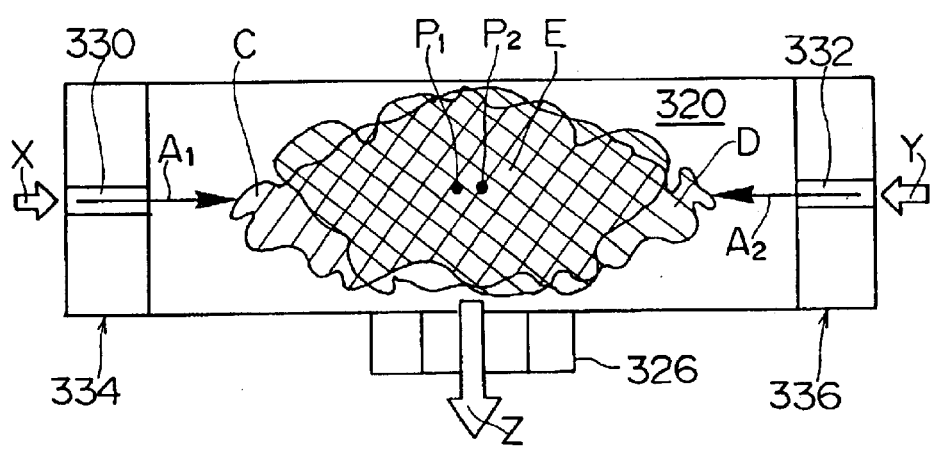
FIG. 28 is a schematic view illustrating eddy viscosity formed in the mixing chamber of the static mixing apparatus according to the fifth embodiment of the present invention.
Figure 29:
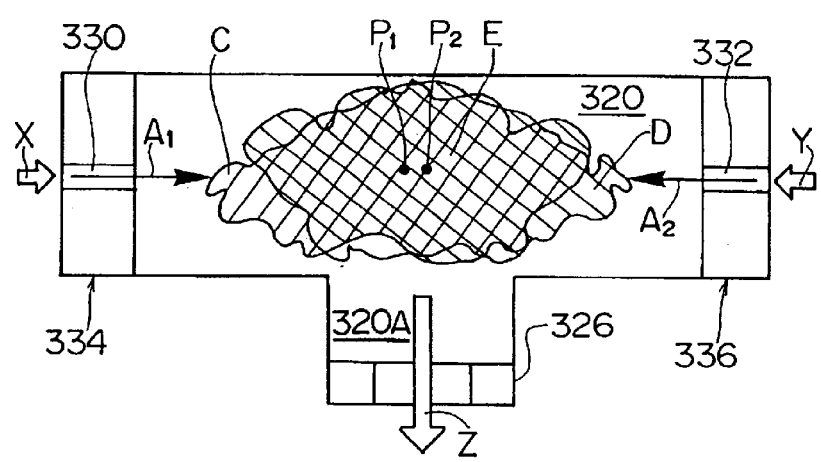
FIG. 29 is a schematic view illustrating eddy viscosity formed in the mixing chamber at the static mixing apparatus according to the fifth embodiment of the present invention with the position of the orifice formed in the discharge duct changed.

Then, as appreciated from FIGS. 28 and 29, the aqueous solution of silver nitrate X and aqueous solution of haloid salt Y are blown out from the first nozzle 334 and the second nozzle 336 from one end to the other of the mixing chamber 320 into the mixing chamber 320 as two rectilinear flows $A_1$ and $A_2$ of turbulent flow and the aqueous solution of haloid salt and aqueous solution of silver nitrate are allowed to mix and react with each other instantaneously by overlapping two eddy viscosities C and D formed by these two rectilinear flows $A_1$ and $A_2$ to form a liquid resulting from the mixing and reaction Z including silver halide emulsion particles.

Such mixing and reaction provides a high mixing efficiency by overlapping the eddy viscosities C and D formed in the mixing chamber 320 by the two facing high-speed rectilinear flows $A_1$ and $A_2$ of turbulent flow in such a way that the overlapping area E grows to the maximum possible size when the respective viscosities C and D reach a maximum.

Therefore, the above-described mixing chamber 320, first and the second nozzles 334 and 336 and discharge duct 326 of the static mixing apparatus 312 are formed in such a way as to have the following relationship.

That is, it is necessary to form eddy viscosities C and D in the mixing chamber 320 and the cylindrical diameter $D_1$ of the mixing chamber 320 is formed to be greater than the orifice diameter $D_2$ of the first nozzle 334 and orifice diameter $D_3$ of the second nozzle 336 as shown in FIG. 27. More specifically, the dimensional ratio of the cylindrical diameter $D_1$ of the mixing chamber 320 to the orifice diameter $D_2$ of the first nozzle 334 is preferably in a range of 1.1 to 50 times, more preferably in a range of 1.1 to 20 times. Likewise, the dimensional ratio of the cylindrical diameter $D_1$ of the mixing chamber 320 to the orifice diameter $D_3$ of the second nozzle 336 is preferably in a range of 1.1 to 50 times, more preferably in a range of 1.1 to 20 times.

Furthermore, it is preferable that the rectilinear flows $A_1$ and $A_2$ do not collide with each other immediately after being blown into the mixing chamber 320 and it is preferable to maximize the area E where the two eddy viscosities C and D formed in the mixing chamber 320 by the two rectilinear flows $A_1$ and $A_2$ overlap each other. For this purpose, it is preferable to set the distance L between the facing first nozzle 334 and second nozzle 336, in other words, the length of the mixing chamber 320 appropriately. Thus, setting the distance L between the first nozzle 334 and second nozzle 336 appropriately makes it possible to reliably increase the area E where the maximized eddy viscosities C and D overlap each other and also allow the two eddy viscosities C and D to substantially completely overlap each other. Therefore, it is necessary to know the position where the eddy viscosities C and D reach a maximum. With regard to the position of the mixing chamber 320 where the eddy viscosities C and D reach a maximum, it is possible to determine the distance from the first nozzle 334 to the eddy viscosity C and the distance from the second nozzle 336 to the eddy viscosity D by carrying out a simulation beforehand as described in the first embodiment. In this case, as is appreciated from FIG. 28 and FIG. 29, the position where viscosities C and D reach a maximum is not a pinpoint but has a certain area. Therefore, assuming that the positions where eddy viscosities C and D reach a maximum are points $P_1$ and $P_2$, which are substantially central points of the viscosities C and D, it is possible to determine the distance L between the first nozzle 334 and second nozzle 336 as the sum of the distance from the first nozzle to the point $P_1$ and the distance from the second nozzle to the point $P_2$ when the point $P_1$ is matched with the point $P_2$. Furthermore, another method for determining the points $P_1$ and $P_2$ is as follows: According to the analysis by the above-described numerical analysis software, the points $P_1$ and $P_2$ where the eddy viscosities C and D due to rectilinear flows $A_1$ and $A_2$ reach a maximum are related to the flow speeds of the rectilinear flows $A_1$ and $A_2$ and substantially correspond to the positions where the maximum flow speeds of the rectilinear flows $A_1$ and $A_2$ (normally the flow speed at the first or second nozzle position) are reduced to $1/10$. Therefore, it is also possible to calculate the positions where the maximum flow speeds of the rectilinear flows $A_1$ and $A_2$ are reduced to $1/10$ to determine the points $P_1$ and $P_2$. Thus, overlapping the eddy viscosities C and D at positions where eddy viscosities C and D reach a maximum has not only the effect of increasing the contact efficiency at the liquid-liquid interface and improving the mixing/reaction performance but also the effect of suppressing heating caused by liquid-liquid friction produced by collision between the rectilinear flow $A_1$ and rectilinear flow $A_2$.

Furthermore, when a liquid is blown out from the first nozzle 334 and second nozzle 336 of a small diameter into the mixing chamber 320 of a larger diameter, it is likely to cause cavitation and this cavitation forms a gas-liquid interface in the mixing chamber 320 and reduces a mixing efficiency. Thus, in order to increase the mixing efficiency using the eddy viscosities C and D, it is necessary to prevent any gas-liquid interface from being formed in the mixing chamber 320. Therefore, as shown in FIG. 27, it is necessary to narrow the diameter $D_4$ of the discharge duct 326 by the third orifice 338 so that it is smaller than the cylindrical diameter $D_1$ of the mixing chamber 320 and mix the liquids with the pressure of the mixing chamber 320 increased. This can eliminate cavitation, and can thereby further improve the mixing efficiency. However, cavitation cannot be completely eliminated even if the pressure of the mixing chamber 320 is increased by narrowing the discharge duct 326 by means of the third orifice 338, and therefore it is important to adopt a structure whereby the liquid resulting from the mixing and reaction Z could be easily discharged into the discharge duct and no dead space could exist to prevent fine bubbles by cavitation from gathering together to grow into large bubbles. For that purpose, as shown in FIG. 28, instead of connecting the discharge duct 326 to the mixing chamber 320 and narrow the inlet of the discharge duct 326 by means of the third orifice 338, it is rather preferable, as shown in FIG. 29, to make the mixing chamber 320 a T-shaped pipe, form a discharge duct 320A in the mixing chamber 320 and connect the discharge duct provided with the third orifice 338 to this discharge duct 320A from the standpoint of increasing the area where eddy viscosity occurs. To minimize the residence period in the portion in the discharge duct 326 that does not contribute to the mixing, it is preferable to minimize the length of the discharge duct 326 and connect it to the growth tank 16.

When no mixing chamber 320 for forming the eddy viscosities C and D exists, complete mixing of flows requires a very long mixing place, which increases the distance between the first mixed one and the last mixed one and increases the particle size distribution of silver halide emulsion particles.

Furthermore, the shapes of the jet flows output from the first nozzle 334 and second nozzle 336 into the mixing chamber 320 are regulated by the first and second orifices 330 and 332 and this shape of the jet flow affects the mixing/reaction performance. Therefore, it is preferable to use the first and second orifices 330 and 332 for forming various shapes of the jet flow such as string-shaped jet flow, cone-shaped jet flow, parallel-shaped thin-film jet flow or fan-shaped thin-film as appropriate according to the purpose of mixing and reaction. For example, in the case of a very high reaction speed on the order of milliseconds, it is necessary to blow out the two rectilinear flows $A_1$ and $A_2$ so that the eddy viscosities C and D reach a maximum within the narrowest possible range instantaneously and the first and second orifices 330 and 332 that form string-shaped jet flows are preferable. On the other hand, when the reaction speed is relatively low, it is preferable to blow out the rectilinear flows $A_1$ and $A_2$ so that the eddy viscosities C and D reach a maximum within the widest possible range, thereby increasing the area of liquid-liquid interface created by the rectilinear flows $A_1$ and $A_2$, and in this case, the first and second orifices 330 and 332 that form thin-film jet flows are preferable. Furthermore, in the case of a reaction speed intermediate between the very high reaction speed on the order of milliseconds and relatively low reaction speed, the first and second orifices 330 and 332 that form cone-shaped jet flows are preferable.

FIGS. 30(a) to 30(c), 31(a) to 31(c), 32(a) to 32(c), and 33(a) to 33(c) illustrate the first and second orifices 330 and 332 to form string-shaped jet flow, cone-shaped jet flow, parallel-shaped thin-film jet flow and fan-shaped thin-film jet flow, respectively, and each (a) in the figures shows the orifice seen from an end of the orifice, each (b) is a longitudinal sectional view of the orifice and each (c) is a cross-sectional view of the orifice.

Figure 30A:
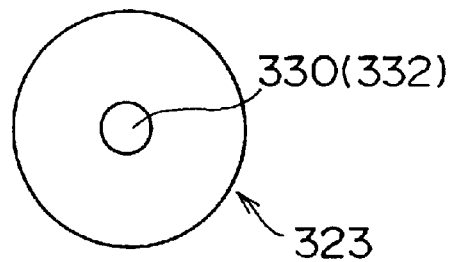
FIGS. 30(a) to 30(c) illustrate the shape of an orifice forming a string-shaped jet flow.
Figure 30B:
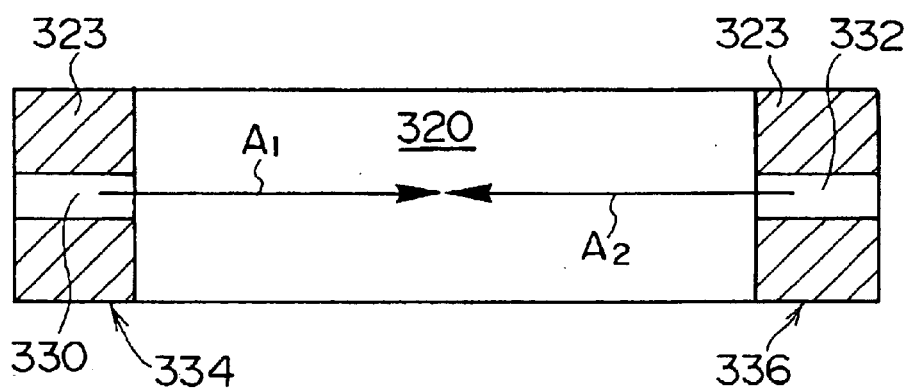
Figure 30C:
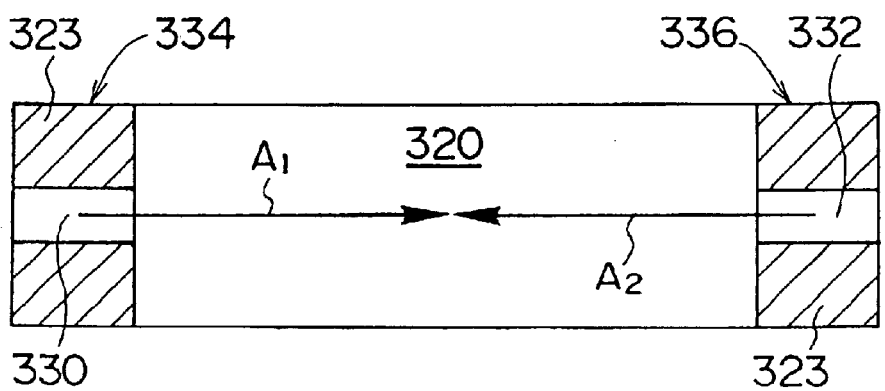
Figure 31A:
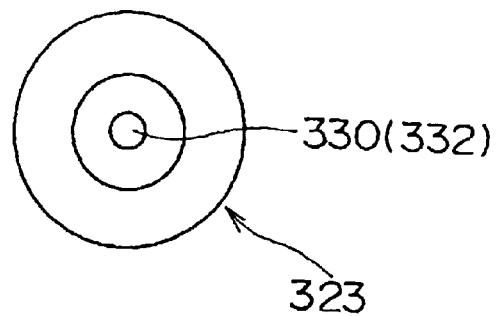
FIGS. 31(a) to 31(c) illustrate the shape of an orifice forming a cone-shaped jet flow.
Figure 31B:
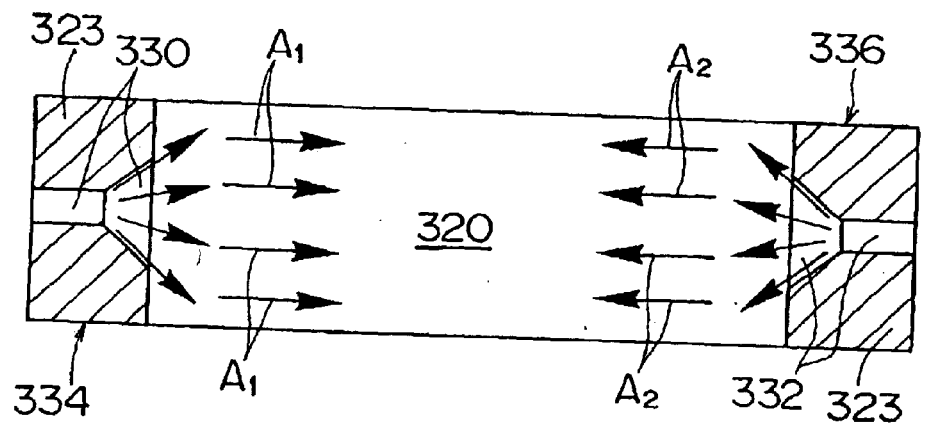
Figure 31C:
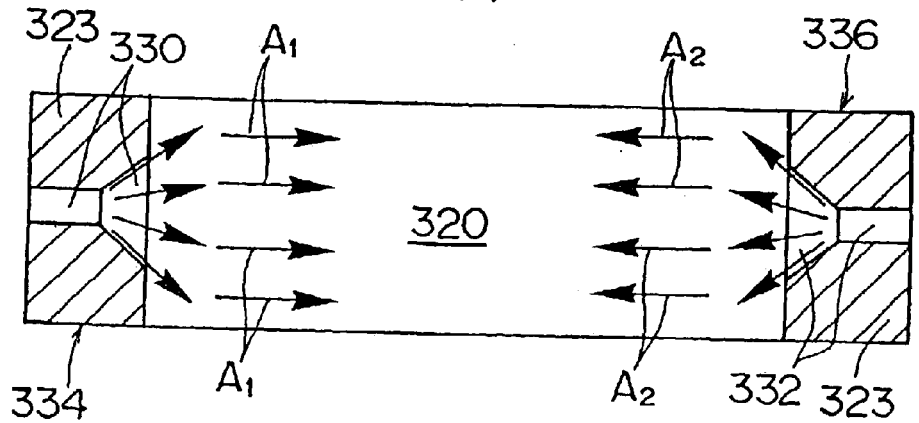
Figure 32A:
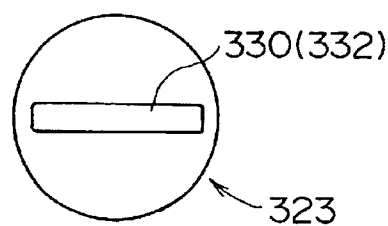
FIGS. 32(a) to 32(c) illustrate the shape of an orifice forming a parallel-shaped thin-film jet flow.
Figure 32B:
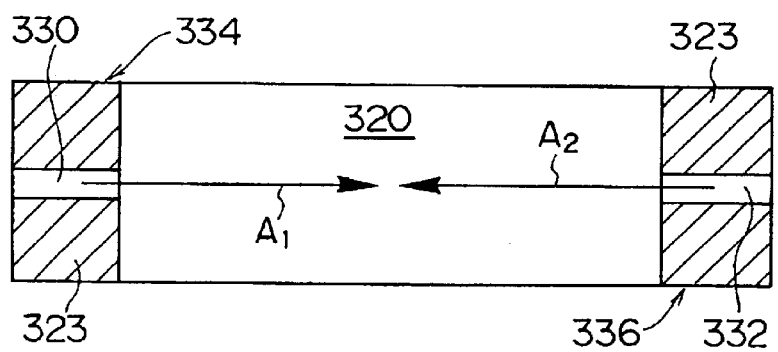
Figure 32C:
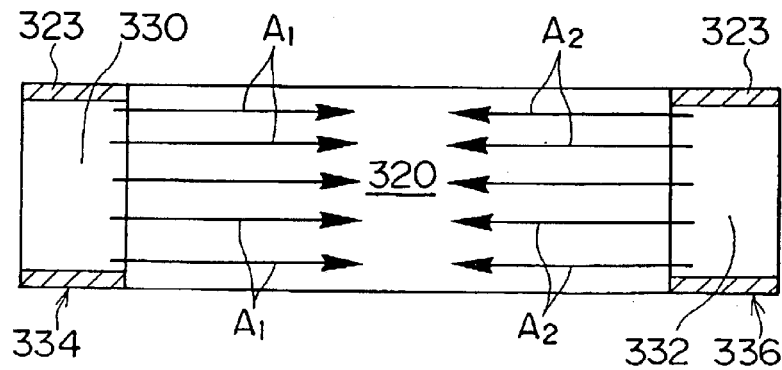
Figure 33A:
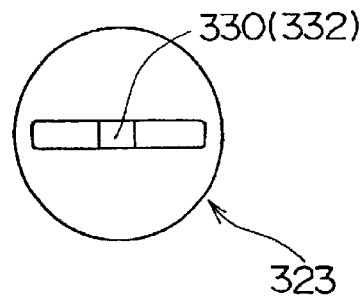
FIGS. 33(a) to 33(c) illustrate the shape of an orifice forming a fan-shaped thin-film jet flow.
Figure 33B:
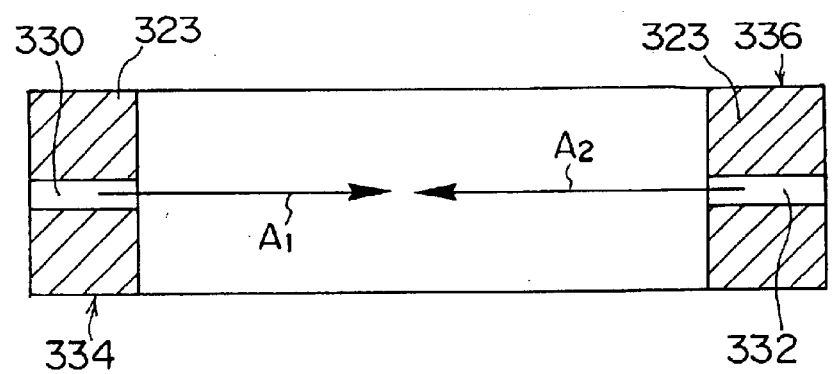
Figure 33C:
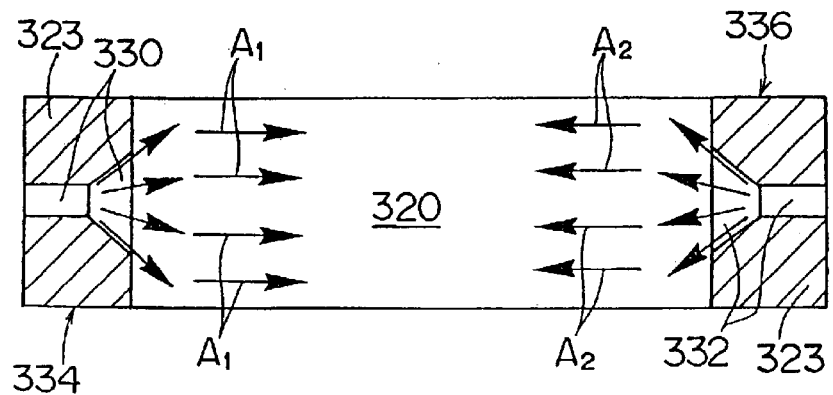

FIGS. 30(a) to 30(c) show the first or second orifice 330, 332 to blow out a string-shaped rectilinear flow $A_1$ ($A_2$) into the mixing chamber 320 and the orifices are formed string-shaped. FIGS. 31(a) to 31(c) show the first or second orifice 330, 332 to blow out a cone-shaped rectilinear flow $A_1$ ($A_2$) into the mixing chamber 320 and the orifices are formed funnel-shaped. FIGS. 32(a) to 32(c) show the first or second orifice 330, 332 to blow out a thin-film rectilinear flow $A_1$ ($A_2$) into the mixing chamber 320 and the orifices are formed slit-shaped. In this case, forming the orientations of the rectilinear flows $A_1$ and $A_2$ so that thin-film planes of the rectilinear flows $A_1$ and $A_2$ face each other is more preferable because this will increase the area of a liquid-liquid interface between the rectilinear flows $A_1$ and $A_2$. FIGS. 33(a) to 33(c) show the first or second orifice 330, 332 to blow out fan-shaped thin-film rectilinear flow $A_1$ ($A_2$) into the mixing chamber 320 and the first or second orifice 330, 332 is formed with its end expanded in a fan shape.

With respect to the slit-shaped first orifice shown in FIGS. 32(a) to 32(c), Formula (1) is used as described in the first embodiment.

Then, a method for forming silver halide emulsion particles using the static mixing apparatus 312 in the above-described configuration will be explained.

The aqueous solution of silver nitrate X and the aqueous solution of haloid salt Y are blown out from the first nozzle 334 formed at one end of the mixing chamber 320 and the second nozzle 336 formed at the other end as the facing rectilinear flows $A_1$ and $A_2$ of turbulent flow into the mixing chamber 320 of a cylindrical diameter $D_1$ greater than the orifice diameters $D_2$ and $D_3$. In this way, by overlapping eddy viscosity C caused by rectilinear flow $A_1$ and eddy viscosity D caused by rectilinear flow $A_2$ in such a way that the area E where the eddy viscosities C and D overlap each other reaches a maximum, the two solutions are allowed to mix and react with each other instantaneously and the liquid resulting from the mixing and reaction Z is discharged from the discharge duct 326.

For the mixing and reaction using such eddy viscosities C and D, there are two methods for improving the mixing and reaction characteristic in the mixing chamber 320.

The first method is the one that the rectilinear flows $A_1$ and $A_2$ are blown out as string-shaped high-speed flows so that the eddy viscosities C and D reach a maximum instantaneously within the narrowest possible range. For this purpose, it is preferable to use the first and second orifices 330 and 332 that form the string-shaped jet flow in FIGS. 30(a) to 30(c) as the first and second orifices 330 and 332 of the first and second nozzles 334 and 336.

From the standpoint of mixing, the rectilinear flows $A_1$ and $A_2$ are preferably high-speed flows, but to control this reaction product to a desired particle size and size distribution, it is necessary to consider the influence of the frictional heat of liquid-liquid friction generated by the high-speed flows on the reaction. As such a measure, it is effective to decrease the temperature of the reaction liquid beforehand, or adopt a double structure for the added ducts, orifice section, mixing chamber section and discharge section to cool these sections or carry out both. Furthermore, since the high-speed flow is determined by a jet pressure added in accordance with the flow speed of the jet and the inner diameters of the first and second orifices 330 and 332, creating faster flows requires the inner diameter of the first and second orifices 330 and 332 to be minimized and the pressure on the liquid to be increased. Therefore, the faster the flows, the more problematic the abrasion of the first and second orifices 330 and 332 becomes, but this can be handled by using diamond with excellent durability, etc.

The second method is the one that the rectilinear flows $A_1$ and $A_2$ are formed in a thin-film jet flow shape to increase the area of the liquid-liquid interface created by the rectilinear flows $A_1$ and $A_2$. For this purpose, it is preferable to use the first and second orifices 330 and 332 that form the parallel-shaped thin-film jet flow or fan-shaped thin-film jet flow shown in FIGS. 32(a) to 32(c) and FIGS. 33(a) to 33(c) as the first and second orifices 330 and 332 of the first and second nozzles 334 and 336 that blow out the rectilinear flows $A_1$ and $A_2$. Since this second method can secure a larger eddy viscosity area, it is possible to obtain favorable mixing performance even if the jet flow speeds of the rectilinear flows $A_1$ and $A_2$ are smaller than those of string-shaped jet flows. This improves the durability characteristic of the first and second orifices 330 and 332, which allows the orifice to be created with metal with good workability, metal processed product, ceramics, etc., and reducing the flow speeds of the rectilinear flows $A_1$ and $A_2$ suppresses generation of frictional heat, which allows finer silver halide emulsion particles to be formed.

EXAMPLE 9

Example 9 is a test conducted using the static mixing apparatus 312 shown in FIG. 27.

That is, the static mixing apparatus 312 is provided with a first nozzle 334 and a second nozzle 336 for blowing out rectilinear flows $A_1$ and $A_2$ of turbulent flow at one end and the other end of a mixer 322 in which a mixing chamber 320 with a cylindrical diameter of 3 mm and a length of 10 mm is formed. Both the first nozzle 334 and the second nozzle 336 have an orifice diameter of 0.2 mm, and an aqueous solution of silver nitrate X of 1.0 mol/L was blown out from the first nozzle 334 at a jet flow speed of 31.25 m/sec and an aqueous solution of potassium bromide of 1.0 mol/L (containing 2% gelatin as protective colloid) was blown out from the second nozzle 336 at a jet flow speed of 31.25 m/sec. Furthermore, a discharge duct 326 with a discharge port having a diameter of 1.2 mm was connected to the central section of the mixer 322.

Figure 34:
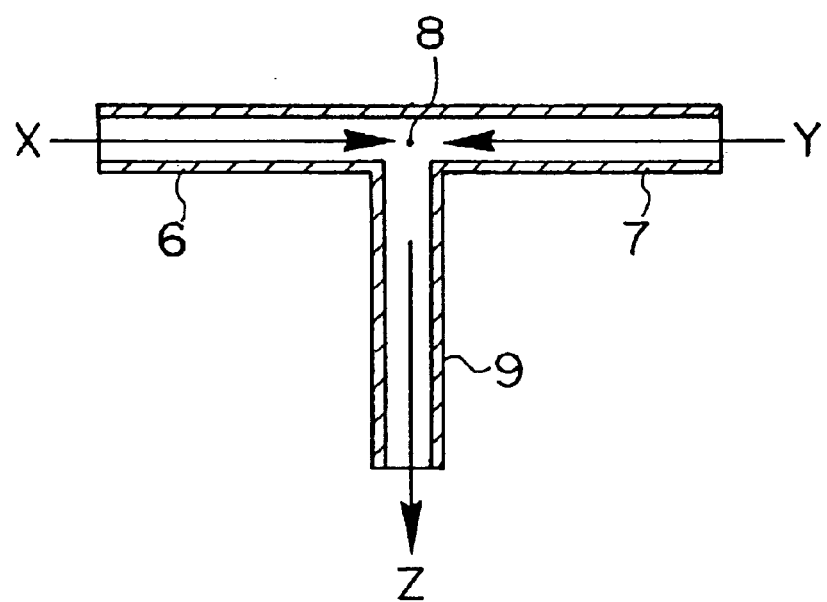
FIG. 34 illustrates a conventional T-shaped pipe type static mixing apparatus used as a comparative example.

On the other hand, the comparative example is a test conducted using the T-shaped pipe static mixing apparatus shown in FIG. 34.

In the comparative example, the duct diameters of a first added duct 6 and a second added duct 7 were set to 1 mm and the duct diameter of a discharge duct 9 was set to 1.5 mm. Then, an aqueous solution of silver nitrate X of 1.0 mol/L was blown out into the first added duct 6 at a jet flow speed of 5 m/sec and an aqueous solution of potassium bromide of 1.0 mol/L (containing 2% gelatin as protective colloid) was blown out into the first added duct 7 at a jet flow speed of 5 m/sec, and both liquids were allowed to collide with each other at an intersection 8 of the T-shape pipe and discharged from the discharge duct 9.

The silver halide emulsion particles formed using the static mixing apparatuses of the example and comparative example were frozen drastically with liquid nitrogen and their particle sizes were measured using an electron microscope.

As a result, the average particle size of the silver halide emulsion particles formed by the static mixing apparatus of the example was 8.6 nm, the variation coefficient was 21% and showed a good mono-dispersion characteristic. On the other hand, the average particle size of the silver halide emulsion particles formed by the static mixing apparatus of the comparative example was 18 nm and the variation coefficient was 36%, which was greater than that of the example.

As described above, the method and apparatus for forming silver halide emulsion particles according to the present invention can reduce frictional heat when an aqueous solution of silver salt is mixed with an aqueous solution of haloid salt, prevent cavitation from occurring, allow mixing and reaction to take place efficiently and optimize the mixing state of static mixing, and can thereby form silver halide emulsion particles in small sizes and with an excellent mono-dispersion characteristic. Furthermore, it can form fine particles with an excellent mono-dispersion characteristic, for example, semiconductor fine particles.

Furthermore, even if a jet flow speed of a rectilinear flow is reduced, the present invention can obtain good mixing performance.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for forming fine particles by blowing out a plurality of types of solutions from their respective nozzles into a mixing chamber of a larger diameter than diameters of the nozzles to allow the solutions to mix and react with each other and discharging a liquid resulting from the mixing and reaction from a discharge port of a smaller diameter than the diameter of the mixing chamber, wherein one of the plurality of types of solutions is blown out into the mixing chamber as a rectilinear flow of turbulent flow, and at a position before eddy viscosity which is formed when the rectilinear flow is blown out from the nozzle into the mixing chamber reaches a maximum, the other of the plurality of types of solutions is blown out as a crossflow that crosses the rectilinear flow at a substantially right angle, and the plurality of types of solutions are thereby allowed to mix and react with each other instantaneously.

2. A method for forming fine particles by blowing out a plurality of types of solutions from their respective nozzles into a mixing chamber of a larger diameter than diameters of the nozzles to allow the solutions to mix and react with each other and discharging a liquid resulting from the mixing and reaction from a discharge port of a smaller diameter than the diameter of the mixing chamber, wherein one of the plurality of types of solutions is blown out into the mixing chamber as a rectilinear flow of turbulent flow, and at a position before the rectilinear flow is reduced to $1/10$ or less of a maximum flow speed, the other of the plurality of types of solutions is blown out as a crossflow that crosses the rectilinear flow at a substantially right angle, and the plurality of types of solutions are thereby allowed to mix and react with each other instantaneously.

3. A method for forming silver halide emulsion particles by blowing out an aqueous solution of silver salt and an aqueous solution of haloid salt from their respective nozzles into a mixing chamber of a larger diameter than diameters of the nozzles to allow the solutions to mix and react with each other and discharging a liquid resulting from the mixing and reaction from a discharge port of a smaller diameter than the diameter of the mixing chamber, wherein one of the aqueous solution of silver salt and the aqueous solution of haloid salt is blown out into the mixing chamber as a rectilinear flow of turbulent flow, and at a position before eddy viscosity which is formed when the rectilinear flow is blown out from the nozzle into the mixing chamber reaches a maximum, the other of the aqueous solution of silver salt and the aqueous solution of haloid salt is blown out as a crossflow that crosses the rectilinear flow at a substantially right angle, and the aqueous solution of silver salt and the aqueous solution of haloid salt are thereby allowed to mix and react with each other instantaneously.

4. The method as defined in claim 3, wherein the rectilinear flow is formed in a thin-film shape.

5. The method as defined in claim 3, wherein the jet flow speed of the crossflow is equal to or lower than the flow speed of the rectilinear flow.

6. A method for forming silver halide emulsion particles by blowing out an aqueous solution of silver salt and an aqueous solution of haloid salt from their respective nozzles into a mixing chamber of a larger diameter than diameters of the nozzles to allow the solutions to mix and react with each other and discharging a liquid resulting from the mixing and reaction from a discharge port of a smaller diameter than the diameter of the mixing chamber, wherein one of the aqueous solution of silver salt and the aqueous solution of haloid salt is blown out into the mixing chamber as a rectilinear flow of turbulent flow, and at a position before the rectilinear flow is reduced to $1/10$ or less of a maximum flow speed, the other of the aqueous solution of silver salt and the aqueous solution of haloid salt is blown out as a crossflow that crosses the rectilinear flow at a substantially right angle, and the aqueous solution of silver salt and the aqueous solution of haloid salt are allowed to mix and react with each other instantaneously.

7. A method for forming silver halide emulsion particles by allowing an aqueous solution of silver salt and an aqueous solution of haloid salt to mix and react with each other to form silver halide emulsion particles, wherein at an intermediate point of a first nozzle from which one of the aqueous solution of silver salt and the aqueous solution of haloid salt is blown out as a rectilinear flow of turbulent flow, the other of the aqueous solution of silver salt and the aqueous solution of haloid salt is blown out from a second nozzle as a crossflow that crosses the rectilinear flow at a substantially right angle, merged with the rectilinear flow, then the rectilinear flow entrained by the crossflow is blown out into a mixing chamber of a larger diameter than a diameter of the first nozzle to allow the aqueous solution of silver salt and the aqueous solution of haloid salt to mix and react with each other, and a liquid resulting from the mixing and reaction is discharged from a discharge port of a smaller diameter than the diameter of the mixing chamber.

\* \* \* \* \*